(12) United States Patent
    Rawdon

(10) Patent No.: US 12,559,220 B2
(45) Date of Patent: Feb. 24, 2026

(54) BLENDED WING BODY AIRCRAFT AIRFRAME AND METHOD OF MANUFACTURE

(71) Applicant: JETZERO, Inc., Long Beach, CA (US)

(72) Inventor: Blaine Rawdon, Long Beach, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 18/101,877

(22) Filed: Jan. 26, 2023

(65) Prior Publication Data

US 2024/0253760 A1 Aug. 1, 2024

(51) Int. Cl.
    *B64C 1/06*     (2006.01)
    *B64C 1/10*     (2006.01)
    *B64C 1/12*     (2006.01)
    *B64C 39/10*    (2006.01)

(52) U.S. Cl.
    CPC .............. *B64C 1/061* (2013.01); *B64C 1/10* (2013.01); *B64C 1/12* (2013.01); *B64C 39/10* (2013.01); *B64C 2039/105* (2013.01)

(58) Field of Classification Search
    CPC ... B64C 2039/105; B64C 39/10; B64C 1/061; B64C 1/10; B64C 1/12
    See application file for complete search history.

(56) References Cited

U.S. PATENT DOCUMENTS

| | | | | |
|---|---|---|---|---|
| 2,967,034 A | * | 1/1961 | Eyre | B64C 30/00 |
| | | | | 244/119 |
| 4,946,056 A | * | 8/1990 | Stannard | F17C 1/08 |
| | | | | 220/563 |
| 5,893,535 A | * | 4/1999 | Hawley | B64C 3/00 |
| | | | | 244/119 |
| 5,934,607 A | | 8/1999 | Rising et al. | |
| 6,123,295 A | * | 9/2000 | Wexler | B64D 37/04 |
| | | | | 244/119 |
| 6,568,632 B2 | | 5/2003 | Page et al. | |
| 7,871,042 B2 | * | 1/2011 | Velicki | B64D 37/06 |
| | | | | 244/135 R |
| 8,061,655 B1 | | 11/2011 | Manley et al. | |
| 8,205,824 B2 | * | 6/2012 | Goos | B64C 1/064 |
| | | | | 244/119 |
| 8,366,050 B2 | | 2/2013 | Odle et al. | |

(Continued)

OTHER PUBLICATIONS

R. H. Liebeck¤, Design of the Blended Wing Body Subsonic Transport, Jan. 1, 2004.

(Continued)

*Primary Examiner* — Philip J Bonzell
(74) *Attorney, Agent, or Firm* — Jeffrey Schox

(57) ABSTRACT

An airframe of a blended wing body aircraft with a non-cylindrical pressure vessel and methods of manufacture. The airframe includes a plurality of longitudinal stiffeners running substantially parallel to a longitudinal axis of the airframe and extending from a top side of the airframe to a bottom side of the airframe. The airframe includes at least a laterally outermost bulkhead configured to resist a cabin pressure. The airframe includes a skin comprising an outer mold line of the airframe that is configured to attach to the plurality of longitudinal stiffeners at the top side of the airframe and the bottom side of the airframe. In some embodiments, the airframe may include an aft pressure bulkhead.

16 Claims, 17 Drawing Sheets

(56) References Cited

U.S. PATENT DOCUMENTS

| | | | |
|---|---|---|---|
| 8,967,526 B2 | 3/2015 | Karem | |
| 9,611,039 B2 | 4/2017 | Lieven et al. | |
| 10,222,001 B2 * | 3/2019 | Croteau | F17C 13/06 |
| 10,279,921 B2 * | 5/2019 | Simpson | B64D 37/30 |
| 10,435,137 B2 | 10/2019 | Mcdonnell | |
| 10,501,163 B2 | 12/2019 | Jörn et al. | |
| 10,800,511 B2 | 10/2020 | Dickey et al. | |
| 10,899,451 B2 * | 1/2021 | Saint-Marc | B64D 11/003 |
| 11,441,731 B2 * | 9/2022 | Grip | F17C 1/00 |
| 11,453,483 B2 * | 9/2022 | Page | B64D 9/00 |
| 2008/0230654 A1 * | 9/2008 | Velicki | B64D 37/04 |
| | | | 244/135 R |
| 2009/0230238 A1 * | 9/2009 | Goos | B64C 1/061 |
| | | | 244/36 |
| 2010/0123047 A1 | 5/2010 | Williams | |
| 2018/0334254 A1 * | 11/2018 | Saint-Marc | B64D 11/003 |
| 2020/0307789 A1 | 10/2020 | Princen et al. | |
| 2021/0003252 A1 * | 1/2021 | Grip | B64C 39/10 |
| 2022/0001974 A1 * | 1/2022 | Page | B64D 9/00 |
| 2023/0002037 A1 * | 1/2023 | Page | B64C 25/14 |

OTHER PUBLICATIONS

Mvek Mukhopadhyay, Hybrid Wing-Body Pressurized Fuselage and Bulkhead, Design and Optimization, Apr. 8, 2013.
Hansen, Heinze, Horst, Blended Wing Body Structures in Multi-disciplinary Pre-Deisgn, Jun. 27, 2007.

* cited by examiner

204

208

212

216

216

BLENDED WING BODY AIRCRAFT AIRFRAME AND METHOD OF MANUFACTURE

FIELD OF THE INVENTION

The present invention generally relates to the field of aircraft. In particular, the present invention is directed to a blended wing body aircraft with a non-cylindrical pressure vessel and methods of manufacture.

BACKGROUND

Human flight is a large contributor of greenhouse gases, the effects of which are compounded by inefficient aircraft designs. Presently, current aircraft designs are tightly constrained in both storage volume and weight.

SUMMARY OF THE DISCLOSURE

In an aspect, a blended wing body (BWB) aircraft with a combustion engine is shown. The airframe of a blended wing body aircraft, the airframe includes a plurality of longitudinal stiffeners running substantially parallel to a longitudinal axis of the airframe and extending from a top side of the airframe to a bottom side of the airframe. The plurality of longitudinal stiffeners includes at least a laterally outermost bulkhead configured to resist a cabin pressure. Airframe further includes a skin having an outer mold line of the airframe and configured to attach to the plurality of longitudinal stiffeners at the top side of the airframe and the bottom side of the airframe. The airframe also includes at least an aft pressure bulkhead running substantially orthogonal to the longitudinal axis, extending from the top side of the airframe to the bottom side of the airframe configured to resist the cabin pressure.

In another aspect, a method of manufacture an airframe of a blended wing body aircraft is shown. The method of manufacturing an airframe of a blended wing body aircraft includes installing a plurality of longitudinal stiffeners substantially parallel to a longitudinal axis of the airframe, extending from a top side of the airframe to a bottom side of the airframe. The plurality of longitudinal stiffeners includes at least a laterally outermost bulkhead configured to resist a cabin pressure. The method further includes attaching a skin having an outer mold line of the airframe to the plurality of longitudinal stiffeners at the top side of the airframe and the bottom side of the airframe. The method further includes installing at least an aft pressure bulkhead substantially orthogonal to the longitudinal axis, extending from the top side of the airframe to the bottom side of the airframe configured to resist the cabin pressure.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a blended wing body aircraft having a non-cylindrical pressure vessel. More specifically, aspects of the present disclosure are directed to an airframe of a blended wing body aircraft. The blended wing body aircraft may include a vessel structure, such as an airframe, that resists pressurization while providing sufficient wing surface area, cabin floor area, ceiling height, and cabin length. The structure of the vessel may allow for wing bending loads to be carried across the cabin of the aircraft in the upper skin and lower skin of the aircraft, thus, providing stabilization and avoiding buckling of the skin during, for example, operation of the aircraft. Various embodiments of structural arrangements of aircraft vessel may be provided in this disclosure for long span and shallow depth support.

In the following description, for the purposes of explanation, numerous specific details are set forth in order to provide a thorough understanding of the present invention. For purposes of description herein, relating terms, including "upper", "lower", "left", "rear", "right", "front", "vertical", "horizontal", and derivatives thereof relate to embodiments oriented as shown for exemplary purposes in FIG. 1A. Furthermore, there is no intention to be bound by any expressed or implied theory presented in this disclosure.

Figure 1A:
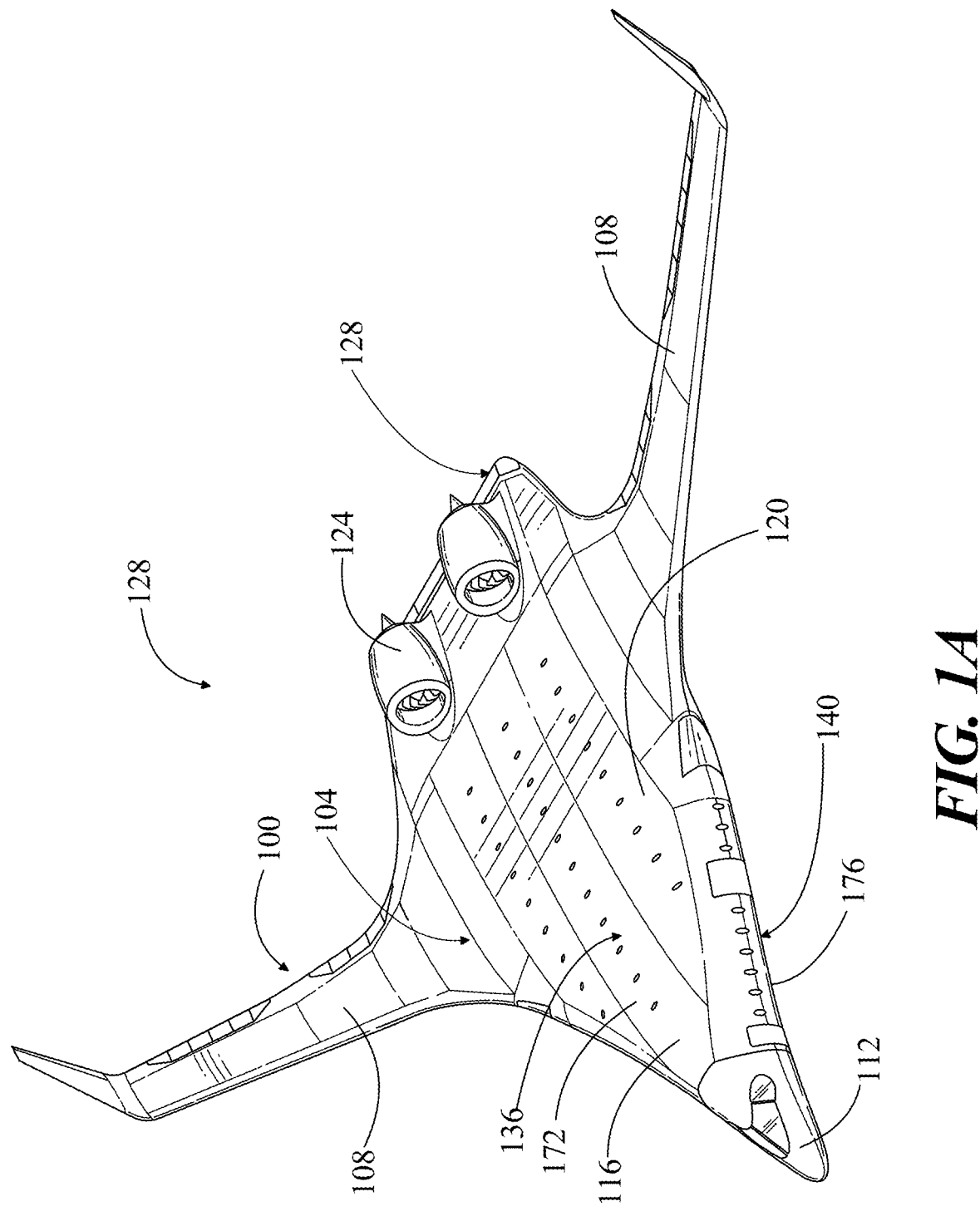
FIG. 1A is a schematic illustration of a top, front, and left perspective view of an airframe of an exemplary blended wing body aircraft in accordance with one or more embodiments of the present disclosure.

Referring now to FIG. 1A, an exemplary embodiment of an airframe 100 of a blended wing aircraft 128 is illustrated. Aircraft 128 may include a blended wing body 104, which includes wings 108 and a fuselage 116. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear demarcation between wings 108 and a main body of aircraft 128, such as fuselage 116, along a leading edge of aircraft 128. For example, and without limitation, BWB aircraft may have distinct wing and body structures, which are smoothly blended together with no clear dividing line or boundary feature between wing and fuselage. This contrasts with a flying wing, which has no distinct fuselage, and a lifting body, which has no distinct wings. BWB 104 design may or may not be tailless. One potential advantage of a BWB may be to reduce wetted area and any accompanying drag associated with a conventional wing-body junction. In some cases, BWB 104 may also have a wide airfoil-shaped body, allowing entire aircraft to generate lift and thereby facilitate reduction in size and/or drag of wings. In some cases, a BWB may be understood as a hybrid shape that resembles a flying wing, but also incorporates features from conventional aircraft. In some cases, this combination may offer several advantages over conventional tube-and-wing airframes. In some cases, BWB airframe 100104 may help to increase fuel economy and create larger payload (cargo or passenger) volumes within the BWB. BWB 104 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft (e.g., cabin), real-time video at every seat can take place of window seats.

With continued reference to FIG. 1A, BWB 104 of aircraft 128 may include fuselage 116 (also referred to in this disclosure as a "body" or "main body"). A "fuselage," for the purposes of this disclosure, refers to a main body of an aircraft 128, or in other words, an entirety of the aircraft 128 except for nose, wings, empennage, nacelles, and control surfaces. In some cases, fuselage 116 may contain a payload of aircraft 128. In one or more embodiments, fuselage 116 may be defined by structural components, as discussed further in this disclosure, that physically support a shape a structure of an aircraft 128. Structural components may take a plurality of forms, alone or in combination with other types. Arrangements of structural components vary depending on construction type of aircraft 128 and specifically, fuselage 116. Fuselage 116 may include a hollow body of aircraft 128 that may be configured to hold cargo and/or passengers. In some cases, fuselage 116 may contain an aircraft's payload. In other cases, fuselage may include one or more cabin's 132, which may be configured to carry passengers or payload. In some embodiments, the center of gravity of the aircraft may be located inside fuselage 104 and aircraft may rotate (e.g., pitch, yaw, roll) about the center of gravity using flight components, such as propulsors 124 (e.g., propellers, rotors, thrust elements, and the like) and/or aerodynamic surfaces (e.g., ailerons, rudders, elevators, and the like). In one or more embodiments, fuselage 116 may comprise structural components that physically support a shape and structure of an aircraft 128, as discussed further below in this disclosure. Structural components may take a plurality of forms, alone or in combination with other types. Structural components vary depending on construction type of aircraft 128 and specifically, fuselage. A fuselage 116 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. Aircraft skin 120 (shown in FIG. 1A) may be layered over a body shape constructed by trusses. Aircraft skin 120 may comprise a plurality of materials such as plywood sheets, aluminum, fiberglass, and/or carbon fiber.

With continued reference to FIG. 1A, BWB may include a skin 120. Skin 120 (also referred to in this disclosure as "structural skin") may be configured to cover structural components of aircraft 128, which are discussed further in this disclosure. For the purposes of this disclosure, a "skin" refers to an outer surface of an aircraft that at least partially covers wings 108 and fuselage 116 of aircraft 128. Skin 120 may include an outer-mold-line (OML) of airframe 100. For example, and without limitation, skin 120 may define an OML of airframe 100. Skin 120 may provide an aerodynamic surface of aircraft 128. In one or more embodiments, skin 120 may be composed of metal alloys, such as aluminum alloy, carbon fiber, and the like. In one or more embodiments, skin 120 may be configured to attached to a plurality of longitudinal stiffeners 148 of airframe 100 at a top side 136 of airframe 100 and a bottom side 140 of airframe 100. For the purposes of this disclosure, a "longitudinal stiffener" is a stiffener extending parallel to a longitudinal axis of an aircraft. In one or more embodiments, skin 120 may include an upper skin 172 at top side 136 of airframe 100 and a lower skin 176 at a bottom side of airframe 100.

Figure 1B:
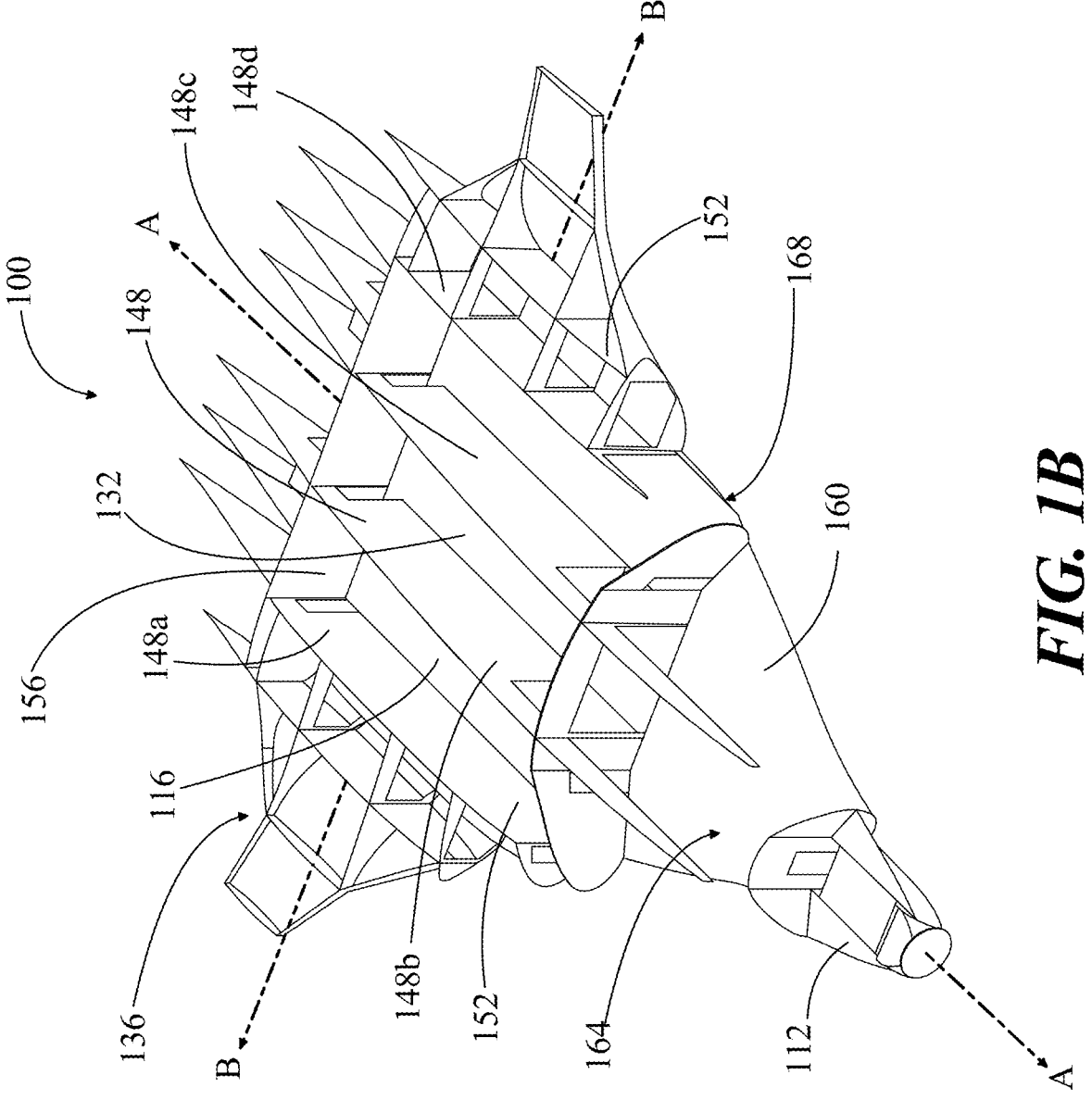
FIG. 1B is a schematic illustration of a top, front, and left perspective view of an airframe of the blended wing body aircraft in accordance with one or more embodiments of the present disclosure.

With reference to FIG. 1B, which shows an exemplary embodiment of airframe 100 without skin 120, fuselage 116 may include an interior cavity 132. Interior cavity 132 may include a volumetric space configurable to house passenger seats and/or cargo. Interior cavity 132 may be configured to include receptacles for fuel tanks, batteries, fuel cells, or other energy sources as described herein. In some cases, a post may be supporting a floor (i.e. deck), or in other words a surface on which a passenger, operator, passenger, payload, or other object would rest on due to gravity when within an aircraft 128 is in its level flight orientation or sitting on ground. A post may act similarly to stringer in that it is configured to support axial loads in compression due to a load being applied parallel to its axis due to, for example, a heavy object being placed on a floor of aircraft 128. A beam may be disposed in or on any portion a fuselage that requires additional bracing, specifically when disposed transverse to another structural element, like a post or rib, that would benefit from support in that direction, opposing applied force. A beam may be disposed in a plurality of locations and orientations within a fuselage as necessitated by operational and constructional requirements.

With continued reference to FIG. 1A again, in some embodiments, fuselage 116 may include a geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 128. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 128 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 1A, according to some embodiments, fuselage may include a monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 1A, according to some embodiments, fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which are may be used in real-world manufacturing for weight savings and for routing of electrical harnesses and other modern onboard systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 1A, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin.

With continued reference to FIG. 1A, in some embodiments, another common structural form is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 1A, stressed skin (e.g., skin 120), when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 104. In some cases, monocoque may be considered to include substantially only structural skin, and in that sense, aircraft skin undergoes stress by applied aerodynamic fluids imparted by fluid. Stress as used in continuum mechanics can be described in pound-force per square inch (lbf/in$^2$) or Pascals (Pa). In semi-monocoque construction stressed skin bears part of aerodynamic loads and additionally imparts force on an underlying structure of stringers and formers.

With continued reference to FIG. 1A, airframe 100 of aircraft 128 may include a nose portion 112. A "nose portion," for the purposes of this disclosure, refers to any portion of aircraft 128 forward of the fuselage 116. Nose portion 112 may comprise a cockpit (for manned aircraft), canopy, aerodynamic fairings, windshield, and/or any structural elements required to support mechanical loads. Nose portion 112 may also include pilot seats, control interfaces, gages, displays, inceptor sticks, throttle controls, collective pitch controls, and/or communication equipment, to name a few. Nose portion 112 may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion 112 may be configured to open in a plurality of orientations and directions.

Now referring to FIG. 1B, an exemplary embodiment of airframe 100, without skin 120, is shown in accordance with one or more embodiments. In one or more embodiments, aircraft 128 may include at least a structural component of aircraft 128. Structural components may provide physical stability during an entirety of an aircraft's 100 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in aircraft's 100 structure, they may be so named A, B, C, and so on named from nose to tail. Pillars, like any structural element, may be disposed a distance away from each other, along an exterior of aircraft 128 and BWB 104. Depending on manufacturing method of BWB 104, pillars may be integral to frame and skin, comprised entirely of internal framing, or alternatively, may be only integral to structural skin elements. Structural skin will be discussed in greater detail below.

With continued reference to FIG. 1B, airframe 100 may include a plurality of materials, alone or in combination, in its construction. In one or more embodiments, airframe 100 may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. In one or more embodiments, frame 100 may include aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snapfits, clamps, and the like. Airframe 100 may additionally or alternatively use wood or another suitably strong yet light material for an internal structure.

With continued reference to FIG. 1B, aircraft 128 may include monocoque or semi-monocoque construction. Frame 100 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others. Rigidity may be defined in terms of stress and strain, wherein "stress" is force per area and "strain" is an elongation or deviation generally represented as a proportion or fraction of a length or angle. For example, and without limitation, the strain of a one-hundred-inch-long rod that is stretched to 101 inches is the one inch of stretch divided by the one-hundred-inch length, or a 1% strain. In the case of shear, strain may be measured by an angular deformation. Rigidity may be considered analogous to stiffness and, for linear displacements, may be quantified as Young's modulus. Young's modulus may be defined as stress divided by strain. Rigidity may be defined as a force necessary to bend and/or flex a material and/or structure to a given degree. In embodiments, carbon fibers may additionally, or alternatively, be composited with other materials like graphite to form reinforced carbon-carbon composites, which include high heat tolerances over 1000° C. A person of skill in the art will further appreciate that aerospace applications may require high-strength, low-weight, high heat resistance materials in a plurality of roles, such as without limitation fuselages, fairings, control surfaces, and structures, among others. Additionally, in some embodiments, composite construction may include three elements: carbon fiber, epoxy resin, and a second fiber. In some cases, second fiber may be a thread that is woven through a ply thickness to prevent delamination. Second fiber may be made of a high tensile strength synthetic materials that may provide extra elongation before failure, such as Kevlar and/or an aramid fiber.

Still referring to FIG. 1B, Airframe 100 (also referred to in this disclosure as a "frame" or "framework") may include one or more structural components of aircraft 128. For the purposes of this disclosure, a "structural component" is a load-bearing component of a frame of an aircraft. Structural components may provide physical stability during an entirety of aircraft's flight envelope, while on the ground and during normal operations. A structural component may include a strut, beam, former, stringer, longeron, interstitial, rib, stiffener, structural skin (e.g., skin 120 of FIG. 1), doubler, strap, spar, panel, and so on. Structural components may also include pillars. In some cases, for the purpose of aircraft cockpits having windows/windshields, pillars may include vertical or near vertical supports around a window configured to provide extra stability around weak points in a structure of aircraft 128, such as an opening where a window is installed. In some embodiments, pillars, like any structural element, may be disposed a distance away from each other, along an exterior of aircraft 128 and BWB 104. Depending on manufacturing method of BWB 104, pillars may be integral to structure and skin, composed entirely of internal framing, or alternatively, may be only integral to structural skin elements.

Still referring to FIG. 1B, and in one or more embodiments of the present disclosure, structural components of airframe 100 may include one or more longitudinal stiffeners 148, which may run substantially parallel to a longitudinal axis A of airframe 100. For example, and without limitation, structural components may include a plurality of stiffeners 148. Plurality of stiffeners 148 may include one or more stiffeners, such as stiffeners 148a-d. Each longitudinal stiffener 148a-d may extend from a top side 136 of airframe 100 to a bottom side 140 of airframe 100 (shown in FIG. 1A). In one or more embodiments, plurality of stiffeners 148 may include at least a laterally outermost bulkhead 152 configured to resist cabin pressure. For the purposes of this disclosure, a "laterally outermost bulkhead" is the last lateral pressure containing component of an airframe. The laterally outermost bulkhead may include the last bulkhead on a right side or a left side of an airframe. In one or more embodiments, airframe 100 may include an aft pressure bulkhead 156, located aft of cabin 132. Aft pressure bulkhead 156 may resists pressure loading between the atmosphere and the cabin at the aft of aircraft 128. For the purposes of this disclosure, an "aft pressure bulkhead" is a rear pressure containing component an airframe. Aft pressure bulkhead 156 may intersect one or more stiffeners 148a-d. Aft pressure bulkhead 156 may be oriented substantially orthogonal to stiffeners 148a-d. For example, and without limitation, aft pressure bulkhead may be positioned parallel to a lateral axis B of airframe 100. In one or more embodiments, aft pressure bulkhead 156 may attach with skin 120 at a top and bottom edge of aft pressure bulkhead 156.

Figure 1C:
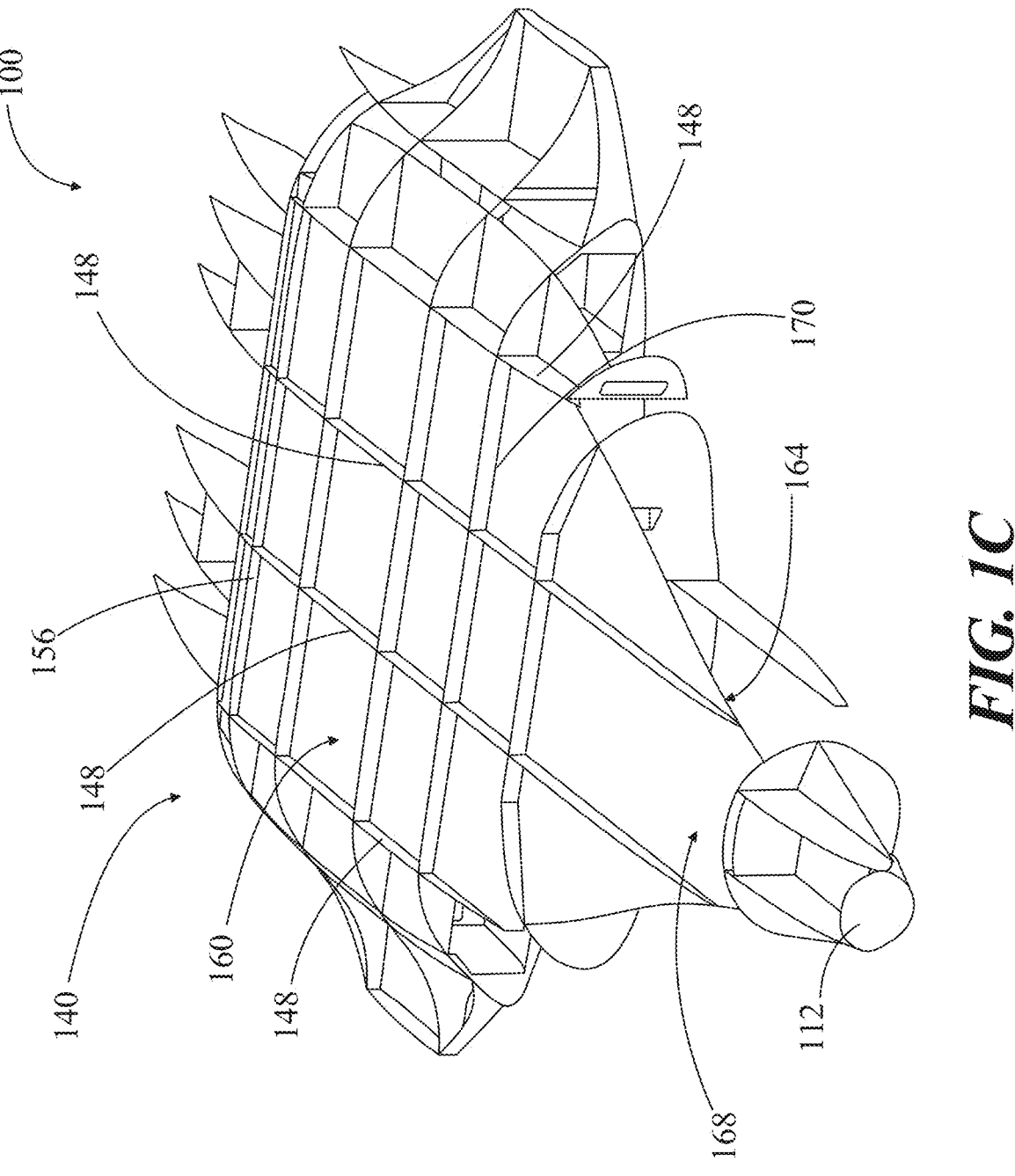
FIG. 1C is a schematic illustration of a bottom, front, and right perspective view of an airframe of the blended wing body aircraft in accordance with one or more embodiments of the present disclosure.

Still referring to FIG. 1B, airframe 100 may include a base 160, which extends over longitudinal axis A and lateral axis B of airframe 100. In one or more embodiments, structural components, such as, for example, longitudinal stiffeners 148 may be attached to base 160. In some embodiments, structural components, such as, for example, stiffeners 148, may traverse through base 160 (as shown in FIG. 1C). For instance, and without limitation, base 160 may include an upper surface 164 and a lower surface 168, where plurality of stiffeners 148 are attached at one or more of upper surface 164 of base 160 and lower surface 168 of base 160. For the purposes of this disclosure, a "base" is a planar structural component that includes a platform, such as an integrated floor, which one or more other structural components may be mounted and/or attached to. For example, and without limitation, plurality of longitudinal stiffeners 148a-d may run lengthwise along base 160 and extend from base 160 toward skin of aircraft, compartmentalizing cabin of fuselage 116 into distinct compartments running longitudinally. In various embodiments, stiffeners 148a-d may each be attached to a top surface 220 of base 160 and extend toward skin (not shown in FIG. 3A). In various embodiments, base 160 may include supports, such as, for example, floor beams, that upper surface 164 and/or lower surface 168 may be attached to. In a nonlimiting embodiment, base 160 may include supports such as lateral floor beams 170 and/or longitudinal stringers that each stiffener 148 may attach to. As shown in FIG. 1B, in some embodiments, one or more stiffeners 148a-d may traverse through base 160 and extend from a bottom surface 224 of base 160 to attach to an underside (e.g., bottom) of skin 120 to provide additional support to airframe 100. In one or more embodiments, two outermost (laterally) longitudinal ribs, such as stiffeners 148a and 208d, may include pressure bulkheads, where a pressure bulkhead resists a pressure loading resulting from low ambient pressure and internal cabin pressure. Each longitudinal stiffener 148a-d may provide structural support for BMW 104. For instance, and without limitation, longitudinal stiffeners 148a-d may provide resistance against wing bend moments, support of payload, resistance against skin buckling, resistance to loadings from air pressure, resistance to shear, tensile, and compression forces, and the like.

Still referring to FIG. 1B, frame 100 may include one or more support elements. "Support elements", for the purposes of this disclosure, are components that reduce and/or redistribute pressures or loads experienced by a vessel structure (e.g., airframe) of an aircraft during operation. Support elements may strengthen airframe 100 and prevent buckling of skin 120. Various exemplary embodiments, of support elements are further discussed in FIGS. 3-8.

With reference again to FIG. 1A, aircraft 128 may include at least a flight component 124. A flight component 124 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 128 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 128. In some embodiments, at least a flight component 124 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 1A, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 1A, at least a flight component may be one or more devices configured to affect aircraft's 100 attitude. "Attitude", for the purposes of this disclosure, is the relative orientation of a body, in this case aircraft 128, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 128. A plurality of attitude datums may indicate one or more measurements relative to an aircraft's pitch, roll, yaw, or throttle compared to a relative starting point. One or more sensors may measure or detect an aircraft's 100 attitude and establish one or more attitude datums. An "attitude datum", for the purposes of this disclosure, refers to at least an element of data identifying an attitude of an aircraft 128.

With continued reference to FIG. 1A, in some cases, aircraft 128 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 1A, in some cases, aircraft 128 may include at least a pilot control. As used in this disclosure, a "pilot control," is an interface device that allows an operator, human or machine, to control a flight component of an aircraft. Pilot control may be communicatively connected to any other component presented in aircraft 128, the communicative connection may include redundant connections configured to safeguard against single-point failure. In some cases, a plurality of attitude datums may indicate a pilot's instruction to change heading and/or trim of an aircraft 128. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, that is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and aircraft 128. "Throttle", for the purposes of this disclosure, refers to an aircraft outputting an amount of thrust from a propulsor. In context of a pilot input, throttle may refer to a pilot's input to increase or decrease thrust produced by at least a propulsor. Flight components 108 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 1A, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, "torque data" is one or more elements of data representing one or more parameters detailing power output by one or more propulsors, flight components, or other elements of an electric aircraft. A torque datum may indicate the torque output of at least a flight component 124. At least a flight component 124 may include any propulsor as described herein. In embodiment, at least a flight component 124 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 1A, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 1A, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 1A, at least a flight component 124 may include wings, empennages, nacelles, control surfaces, fuselages, and landing gear, among others, to name a few. In embodiments, an empennage may be disposed at the aftmost point of an aircraft body 104. Empennage may comprise a tail of aircraft 128, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 128 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 128 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 104 aircraft 128 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 124 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 124 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 128. Such devices increase an effective aspect ratio of a wing without greatly increasing wingspan. Extending wingspan may lower lift-induced drag, but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e, toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 128 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 1A, aircraft 128 may include an energy source. Energy source may include any device providing energy to at least a flight component 124, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 1A, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels., synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 104 of aircraft 128, for example without limitation within a wing portion of blended wing body 104. Aviation fuels may include petroleum-based fuels, or petroleum and synthetic fuel blends, used to power aircraft 128. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 128. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 1A, modular aircraft 128 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 1A, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 1 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 1A, aircraft 128 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 1A, aircraft 128 may include multiple flight component 124 sub-systems, each of which may have a separate energy source. For instance, and without limitation, one or more flight components 108 may have a dedicated energy source. Alternatively, or additionally, a plurality of energy sources may each provide power to two or more flight components 108, such as, without limitation, a "fore" energy source providing power to flight components located toward a front of an aircraft 128, while an "aft" energy source provides power to flight components located toward a rear of the aircraft 128. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 108. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 1A, aircraft 128 may include a flight component 124 that includes at least a nacelle 108. For the purposes of this disclosure, a "nacelle" is a streamlined body housing, which is sized according to that which is houses, such as without limitation an engine, a fuel store, or a flight component. When attached by a pylon entirely outside an airframe 104 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 128 partially or wholly enveloped by an outer mold line of the aircraft 128. At least a nacelle may be designed to be streamlined. At least a nacelle may be asymmetrical about a plane comprising the longitudinal axis of the engine and the yaw axis of modular aircraft 128.

With continued reference to FIG. 1A, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 1A, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 1A, in nonlimiting embodiments, at least a flight component 124 may include an airbreathing engine such as a jet engine, turbojet engine, turboshaft engine, ramjet engine, scramjet engine, hybrid propulsion system, turbofan engine, or the like. At least a flight component 124 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may includes heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 1A, an aircraft 128 may include a flight controller. As used in this disclosure, a "flight controller" is a device that generates signals for controlling at least a flight component of an aircraft 128. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 1A, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 100 and/or computing device.

With continued reference to FIG. 1A, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1A, flight component 124 may include wings, empennages, nacelles, control surfaces, fuselages, and landing gear, among others, to name a few. In embodiments, an empennage may be disposed at the aftmost point of an aircraft body 104. Empennage may comprise a tail of aircraft 128, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 128 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 128 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 104 aircraft 128 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 124 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 124 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 128. Such devices increase an effective aspect ratio of a wing without greatly increasing wingspan. Extending wingspan may lower lift-induced drag, but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e, toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e. close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 128 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 1A, aircraft 128 may include a flight component 124 that includes at least a nacelle. For the purposes of this disclosure, a "nacelle" is a streamlined body housing, which is sized according to that which is houses, such as without limitation an engine, a fuel store, or a flight component. When attached by a pylon entirely outside an BWB airframe 104 a nacelle may sometimes be referred to as a pod, in which case an engine within the nacelle may be referred to as a podded engine. In some cases, an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 200 partially or wholly enveloped by an outer mold line of the aircraft 128. At least a nacelle may be designed to be streamlined. At least a nacelle may be asymmetrical about a plane comprising the longitudinal axis of the engine and the yaw axis of aircraft 128.

With continued reference to FIG. 1A, a flight component 124 may include a propulsor 124. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 1A, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 1A, in nonlimiting embodiments, at least a flight component 124 may include an airbreathing engine such as a jet engine, turbojet engine, turboshaft engine, ramjet engine, scramjet engine, hybrid propulsion system, turbofan engine, or the like. At least a flight component 124 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term Jet engine, in some cases, refers to an internal combustion airbreathing jet engine such as a turbojet, turbofan, ramjet, or pulse jet. In general, jet engines are internal combustion engines. In this embodiment, engine of aircraft 128 may be a combustion engine. Combustion engine is further explained below. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

Still referring to FIG. 1A, a propulsor of aircraft 200 may comprise a combustion engine. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. Combustion engine is configured to burn the fuel from the fuel source to produce mechanical work. Resulting mechanical work may be used to power the propulsor. Additionally, at least an electric motor of the propulsor may be operatively connected with a fuel cell by way of electrical communication, for example through one or more conductors.

Figure 2A:
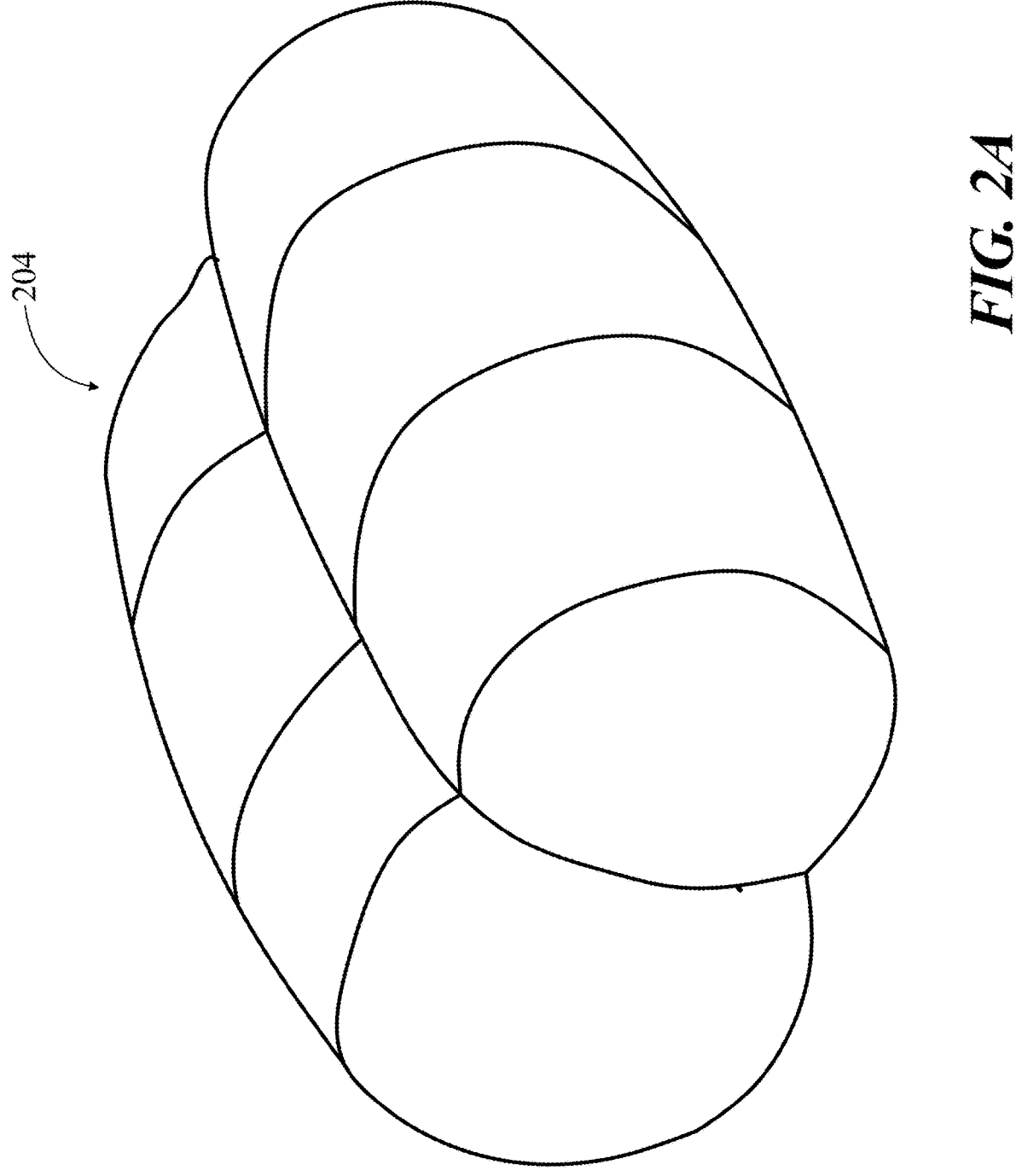
FIG. 2A is a schematic diagram showing an isometric view of an exemplary embodiment of a double-curved airframe in accordance with one or more embodiments of the present disclosure.

Now referring to FIGS. 2A-2G, various exemplary embodiments of airframe geometry are illustrated in accordance with one or more embodiments of the present disclosure. Referring to FIG. 2A, an isometric view of an exemplary embodiment of a double-curved airframe 204 is presented. Airframe 100 may include a double-curved tank. A "double-curved airframe" occurs when a tapered tank is merged with a similar or mirror-image airframe with a central septum. Two airframes forming a double-curved airframe may be intersected along their length and a septum (i.e. junction) may be placed at the airframe junction to address the resulting tension. In this disclosure, a "central septum" is a partition centrally located in a system separating two compartments. In some cases, central septum may not be parallel to the airframe axis; for example, it may be favorable to fill a volume of constant width with a curved, variable-height ceiling. airframe axis may then be adjusted so that a airframe wall on an outer side of a airframe may be a selected distance from a cabin wall of an aircraft or other vehicle.

Figure 2B:
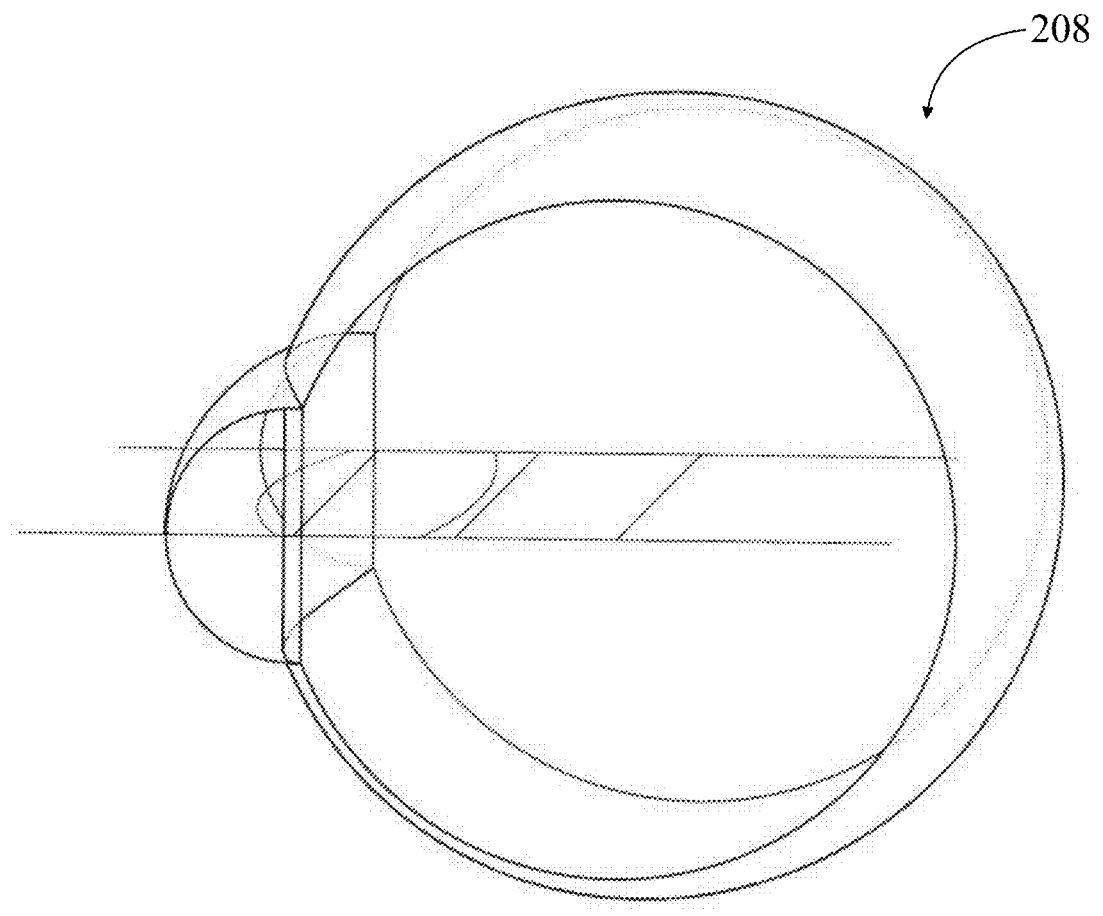
FIG. 2B is a schematic diagram showing a front quarter view of an exemplary embodiment of a dual structure airframe with different diameters in accordance with one or more embodiments of the present disclosure.

Now referring to FIG. 2B, a double-curved airframe 208 need not have identical compartments; a front quarter view of an exemplary embodiment of a dual airframe with different diameters is illustrated. At least an airframe 100 may include a dual airframe with different diameters. In some compartments in this embodiment, height on one side of the compartment may be lower than on the other. Two or more compartments in airframe 100 may have different diameters if ceiling height is different across the cabin. Two or more airframes may be joined with one or more septa that may form a curved surface as seen in top view, see cambered airframes below. In an embodiment, shapes of the compartments may differ; in this case, two merged airframes forming a dual airframe may have different diameters to maximize their height along their length.

Figure 2C:
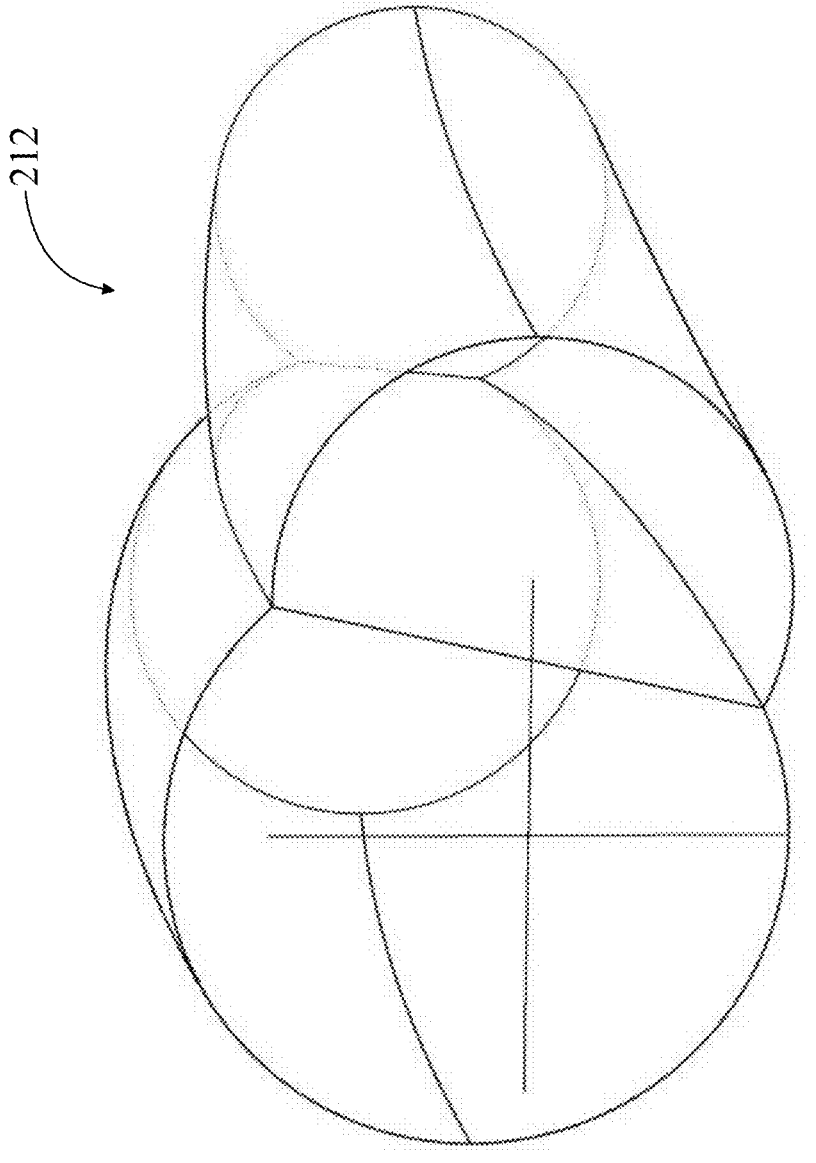
FIG. 2C is a schematic diagram showing a quarter front view of an exemplary embodiment of a double airframe in accordance with one or more embodiments of the present disclosure.

Now referring to FIG. 2C, a quarter front view of an exemplary embodiment of a double airframe 212 is shown. A double airframe, as explained above, may have a curved septum separating two compartments of airframe 100.

Figure 2D:
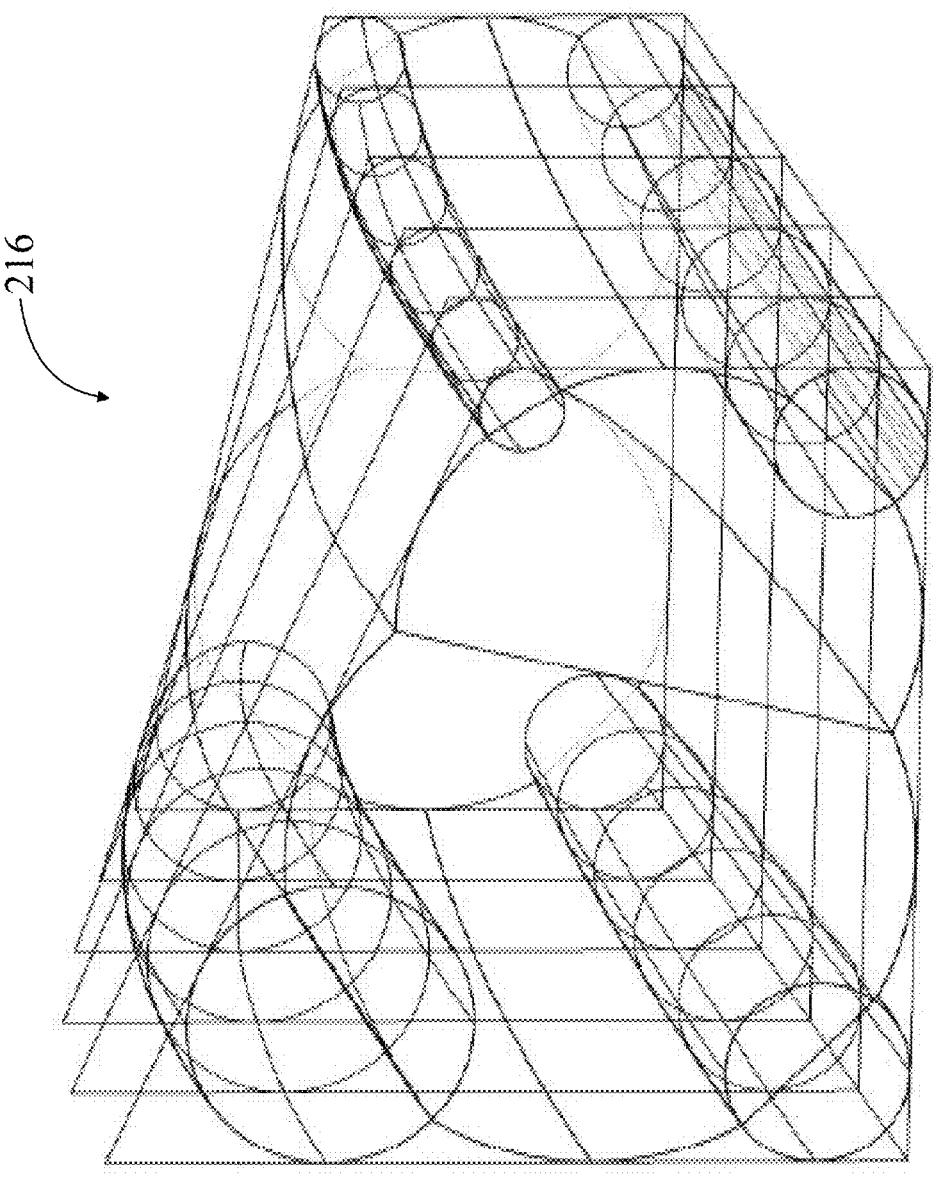
FIG. 2D is a schematic diagram showing a front quarter view of an exemplary embodiment of a multi-compartment airframe without trimming in accordance with one or more embodiments of the present disclosure.
Figure 2E:
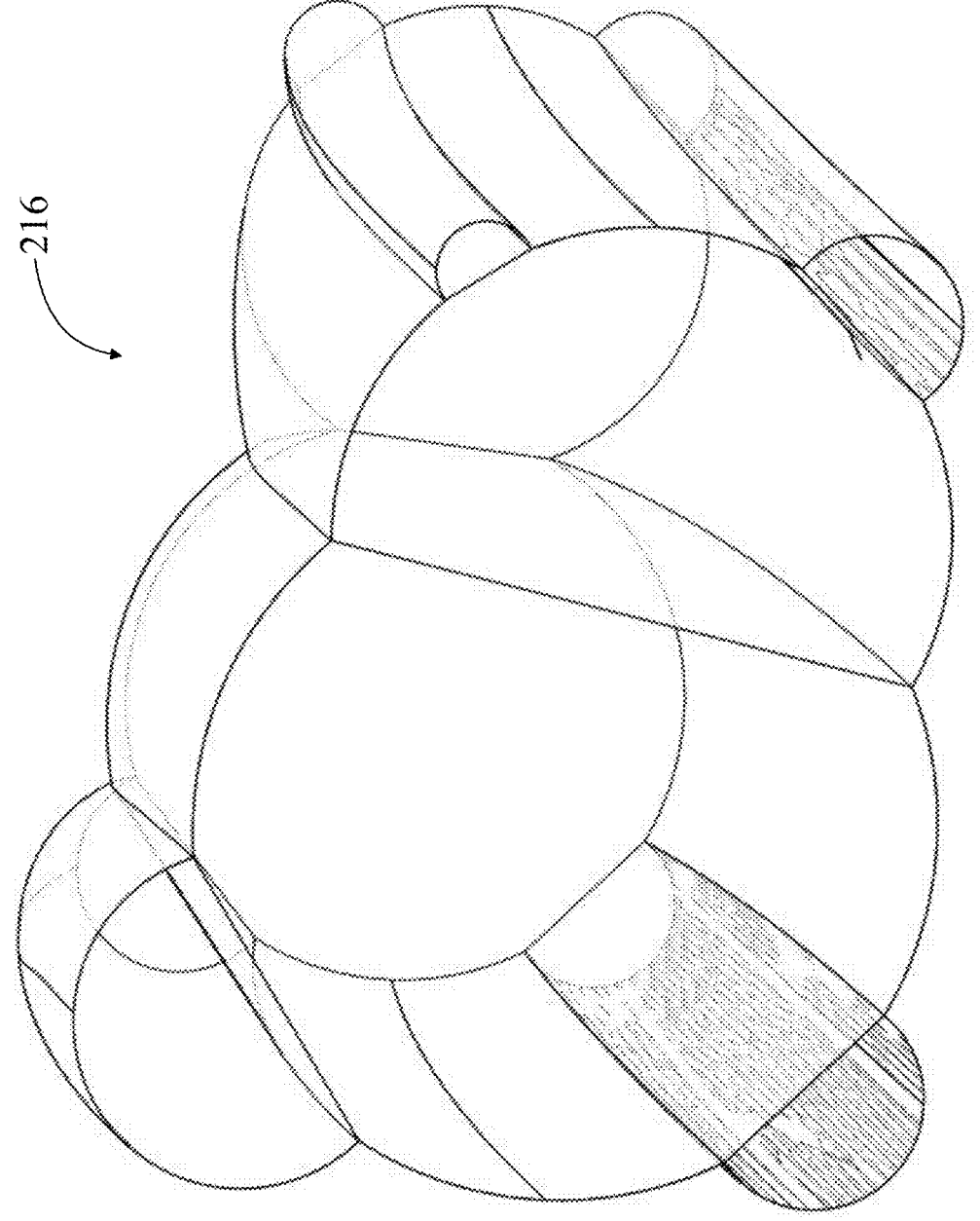
FIG. 2E is a schematic diagram showing a front quarter view of an exemplary embodiment of a multi-compartment airframe trimmed with septa in accordance with one or more embodiments of the present disclosure.

Now referring to FIGS. 2D and 2E, a front quarter view of an exemplary embodiment of a multi-bubble airframe 216 is illustrated in both figures. Given a rectangular cabin cross-section with a longitudinally oriented airframe, this cross-section may be occupied by a single circular cross-section airframe. Alternatively, or additionally, as noted above, a double airframe may be used to provide greater cross-section area within a rectangular cabin. Additional bubbles may be added to fill in corners of a cabin, such as four corners of a rectangular cabin. A "multi-bubble airframe" is an airframe that has more than two compartments attached together. In some cases, two more bubbles may be added to fill in the valleys between the two main airframes. Multi-bubble airframes may have any number of compartments, but there may be a diminishing return on increasing complexity; either engineering judgment or actual engineering may be applied. In an embodiment, a muti-bubble airframe may have four lobes added to fill in the corners of a notional envelope indicated by the lines in the figure. This may provide a more valuable airframe volume for a given compartment volume. Each compartment may have a circular cross section as shown, which may be trimmed to the large, main lobes. Main lobes may then be trimmed to small lobes. Each junction may be then faced with a septum. An illustrative and non-limiting example of this "trimming" can be seen in FIG. 2E, wherein an airframe is trimmed with septa. On the other hand, a multi-bubble airframe as depicted for illustrative purposes in FIG. 2D does not have trimming. At least an airframe 100 may or may not have trimming.

Figure 2F:
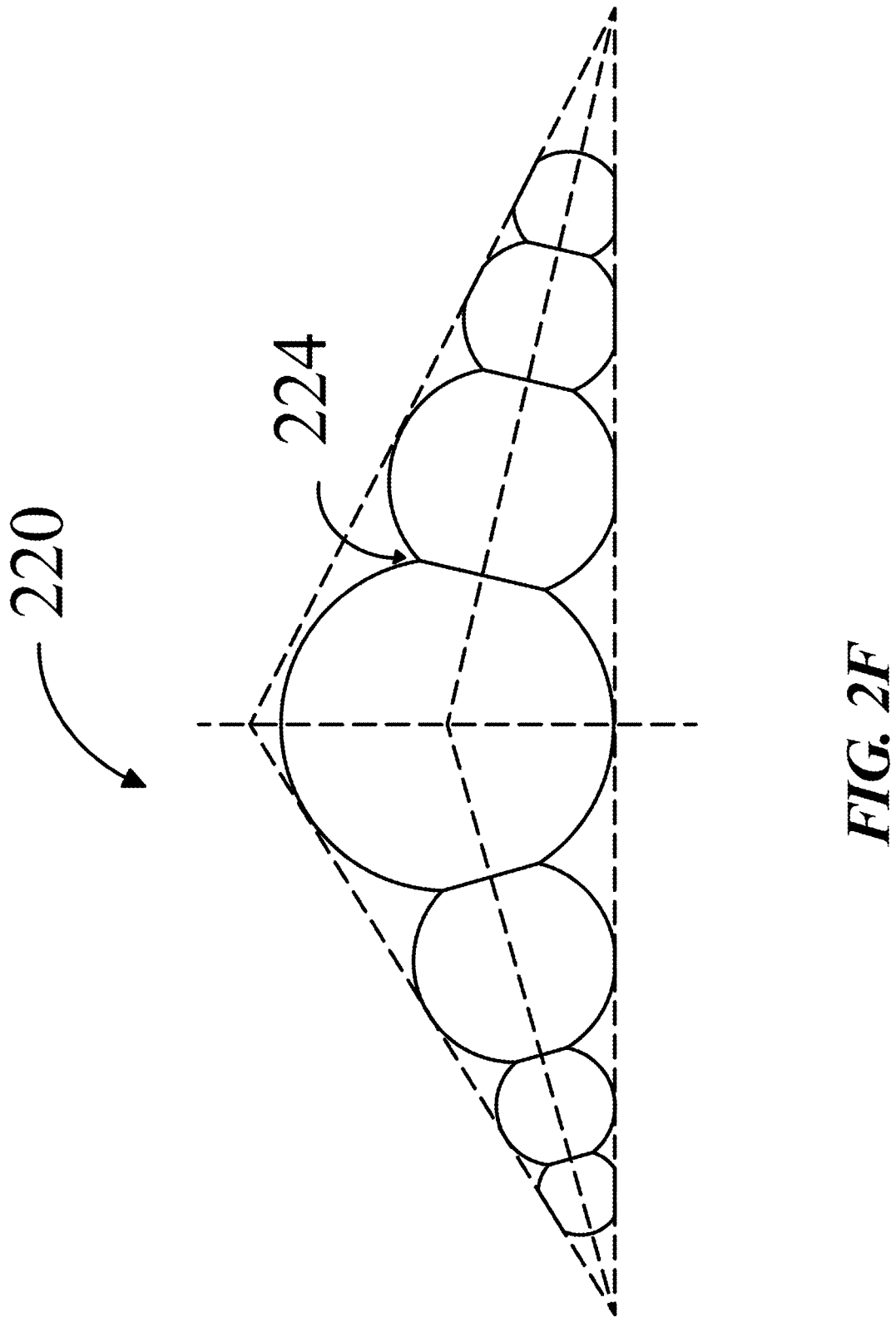
FIG. 2F is a schematic diagram showing a cross-section of an exemplary embodiment of a multi-chambered airframe in accordance with one or more embodiments of the present disclosure.

Now referring to FIG. 2F, an exemplary embodiment of a cross-sectional view of airframe having multiple chambers is illustrated. Multi-chambered airframe 220 may provide pure tension for each chamber wall and septa at each junction 224. Pure tension may be achieved by equal pressure in each chamber of the airframe 220. In some cases, junctions 224 may include convex junctions.

Figure 2G:
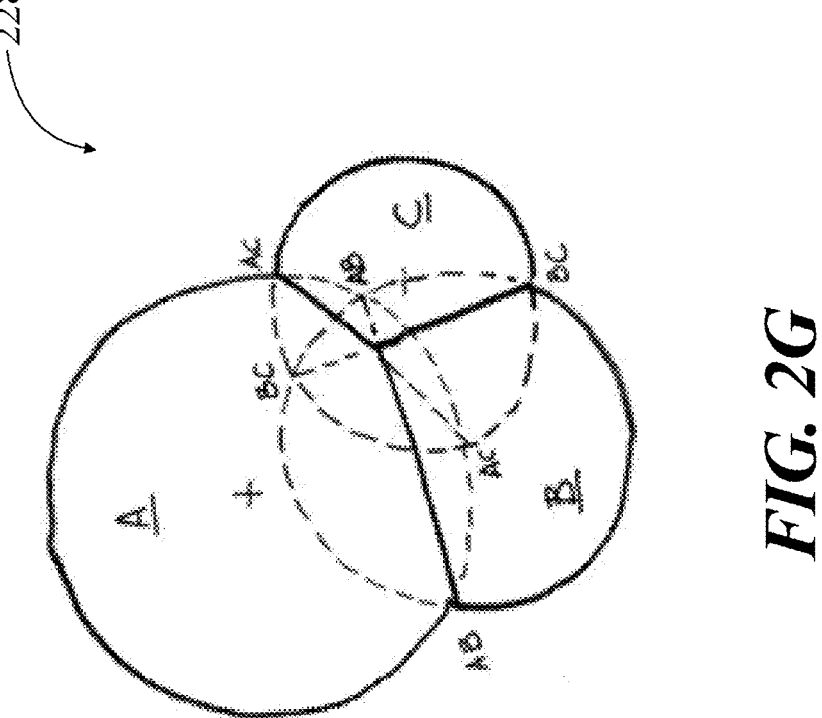
FIG. 2G is a schematic diagram showing a cross-section of an exemplary embodiment of a multi-chambered airframe in accordance with one or more embodiments of the present disclosure.

Referring now to FIG. 2G, a general case for an airframe 228 having multiple compartments is illustrated. FIG. 2G illustrates a cross section of an airframe having three compartments, a first compartment A, a second compartment B, and a third compartment C. Each compartment is approximated by a continuously convex differentiable curve, e.g., a circular section. The cross-section has three intersections between walls for each compartment, AB, AC, and BC. A junction, i.e., septum, runs from each intersection. FIG. 2G illustrates a general case, wherein each junction runs from an actual point of intersection toward an imaginary intersection between walls of intersecting compartments. For example, junction between compartment A and compartment B starts at intersection AB runs toward, a second imaginary intersection between curves AB (as represented by broken lines). In some embodiments, arranging the septa in this manner ensures that stress at each junction is substantially in tension. As can be seen in FIG. 2G, each junction runs (toward the imaginary intersection) until reaching a support (another junction or compartment wall). In some cases, this arrangement ensures that each junction is substantially in tension at each intersection of junctions.

Figure 3:
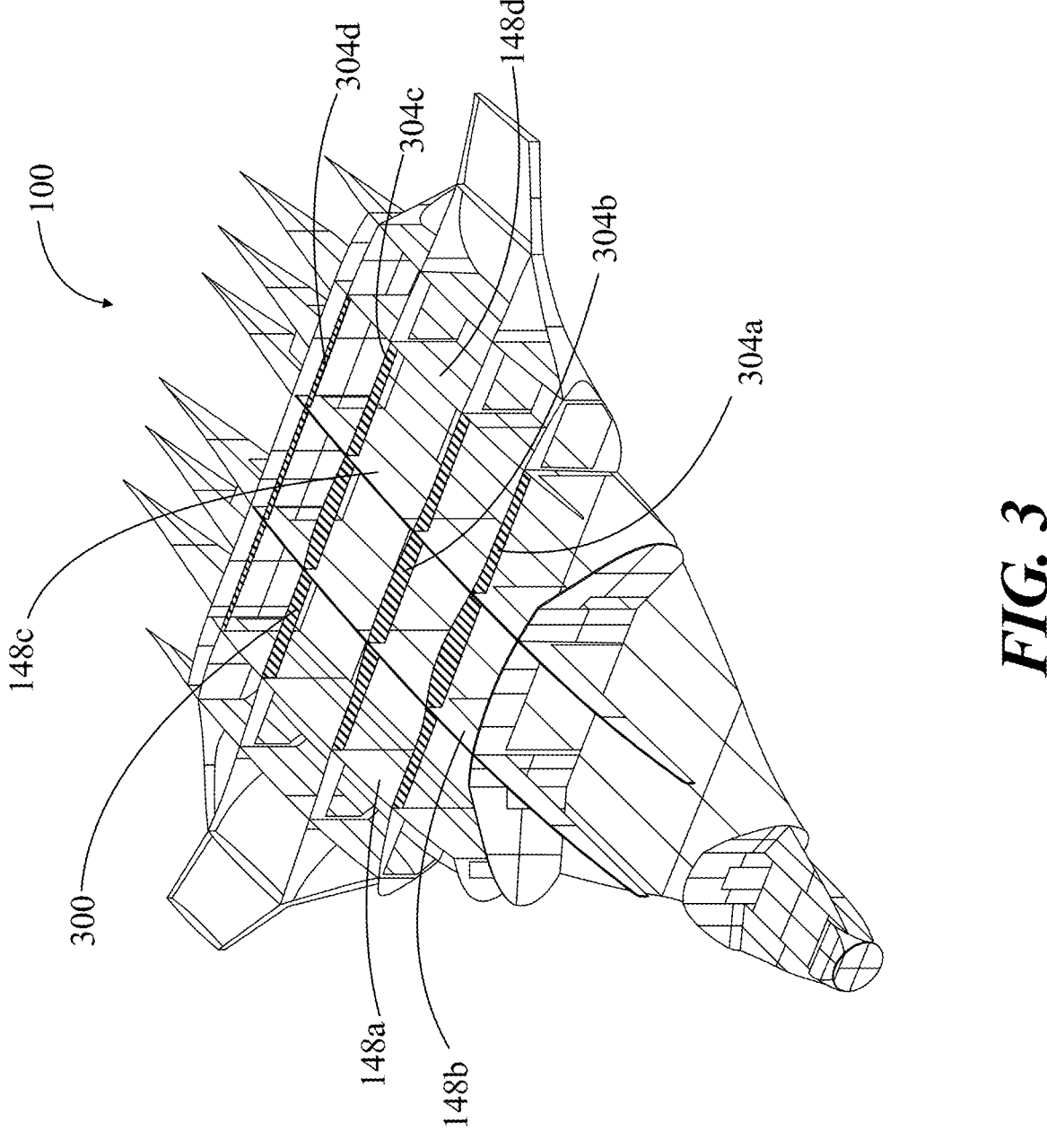
FIG. 3 is a schematic diagram showing a top, front, and left perspective view of an exemplary airframe of the blended wing body aircraft having a first exemplary embodiment of a support element in accordance with one or more embodiments of the present disclosure.

Now referring to FIG. 3, an exemplary embodiment of airframe 100 having a first exemplary embodiment of a support element 300 aircraft 128 is shown in accordance with one or more embodiments of the present disclosure. One or more types of structural components may be arranged to form airframe 100. For example, and without limitation, structural component may include plurality of stiffeners 148. In one or more embodiments, plurality of stiffeners may run parallel to longitudinal axis A of airframe 100. In one or more embodiments, airframe includes at least a support element, such as, for example, support element 300. In one or more embodiments, support element 300 extends substantially orthogonal to longitudinal axis A. Support element 300 may be configured to attach to adjacent longitudinal stiffeners 148 of plurality of longitudinal stiffeners 148. In various exemplary embodiments, support element 300 may include one or more beams 304*a-d* that at least partially extend between one or more stiffeners 148*a-d*. For example, and without limitation, each beam 304*a-d* may traverse laterally across stiffeners 148. Beams 304*a-d* may extend substantially parallel to lateral axis B. Each beam 304*a-d* may include a monolithic component that extends laterally across fuselage 116. Each beam 304*a-d* may be attached to one or more stiffeners 148 and skin 120. For example, and without limitation, an edge of beam 304 may abut and/or be adjoined to an interior surface skin 120 of aircraft 128 that may define, for example, cabin 132.

Figure 4:
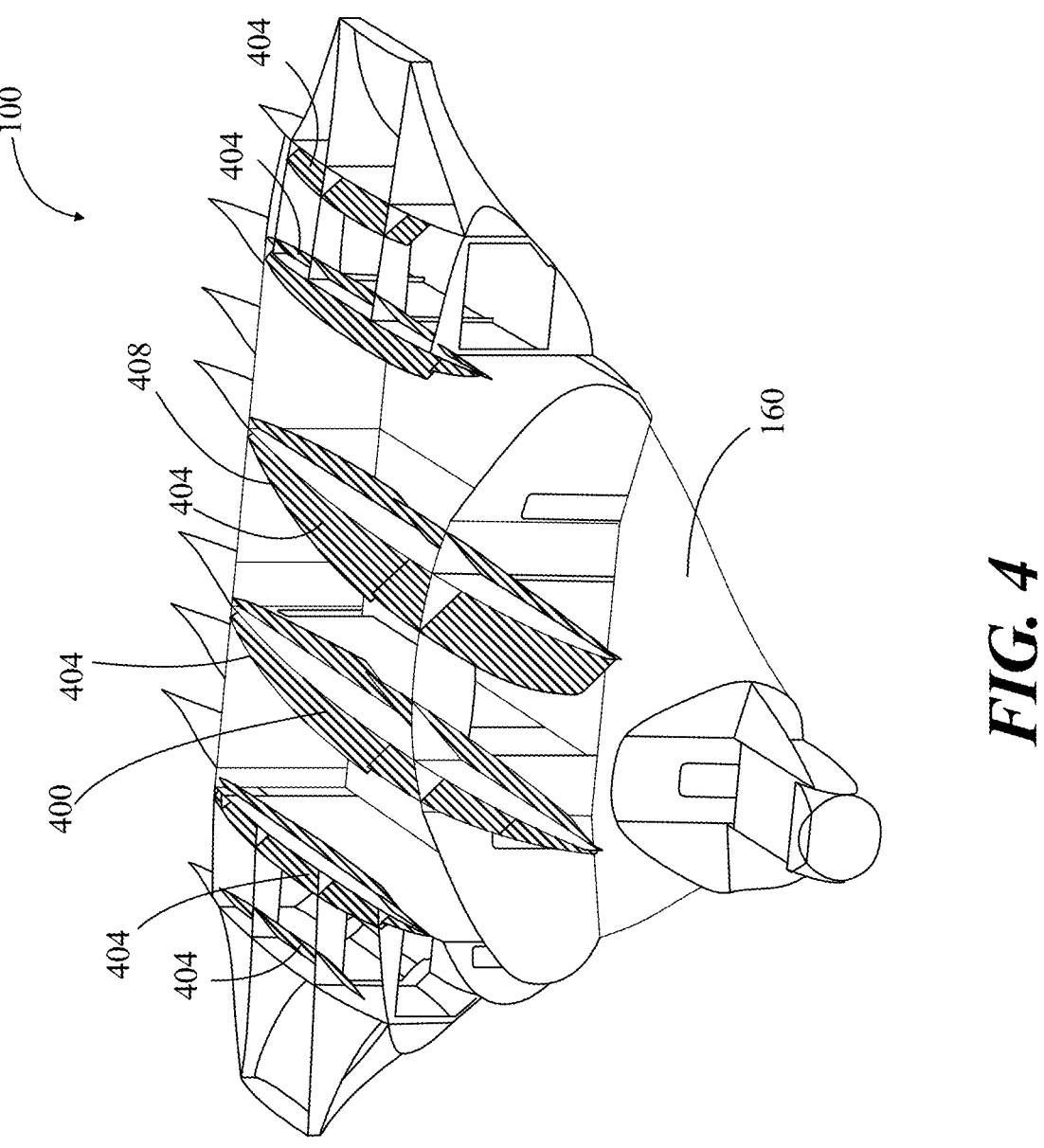
FIG. 4 is a schematic diagram showing a second exemplary embodiment of a support element of the airframe in accordance with one or more embodiments of the present disclosure.

Now referring to FIG. 4, a second exemplary embodiment of support element 400 is shown. In one or more embodiments, support element 400 may include one or more fins 404. For instance, and without limitation, support element 400 may include a plurality of fins 404. In various embodiments, support element 400 may include a pair of opposing fins that form a "Y"-shaped support element that extend from opposing surfaces of a least a longitudinal stiffener 148*a-d* of the plurality of longitudinal stiffeners 148 and attaches to skin 120, such as an underside surface of skin 120. In one or more embodiments, fins 404 include intermediate ribs attached to primary ribs, such as stiffeners 148, to provide structural support to aircraft 128. In one or more embodiments, fins 404 may include opposing fins that are attached to opposite sides, or surfaces, of stiffener 148. Fins 404 may include opposing fins, where a first fin is attached to a first surface of stiffener 148 and a second fin is attached to a second surface of stiffener 148. Fin 404 may be attached to a surface of stiffener 148 at a proximal end of fin 404. Fin 404 may extend from stiffener to a proximal end, which may attach to skin 120 (shown in FIG. 1A) of aircraft 128. Fin 404 may be angled relative to stiffener 148. For example, and without limitation, a surface of fin 404 and an adjacent surface of stiffener 148 may form an acute angle. In some embodiments, all fins may be positioned at the same angle relative to a corresponding rib. In other embodiments, each fin 404 may be angled differently relative to a corresponding stiffener 148. Opposing fins 404 may attached to stiffeners 148 to form a substantial "Y"-shaped support element. For example, and without limitation, fins 404 may include opposing planes, positioned on either side of stiffener 148. In one or more embodiments, each fin 404 may include a curved edge 408. For example, and without limitation, curved edge 408 of fin 404 may include a curvature complementary to skin 120 so that edge 4082 may abut and/or contact skin 120 of aircraft 128 to provide structural support. In nonlimiting embodiments, distal end of fin 404 may be attached to skin 120 and proximal end of fin 404 may be attached to stiffener 148.

Still referring to FIG. 4, fins 404 may be integral to stiffener 148, separate from stiffener 148, or a combination thereof. For example, and without limitation, structural element 304 and stiffener 148 may include a monolithic component. In some embodiments, monolithic component may include bifurcated ("Y"-shaped) plane. In other embodiments, monolithic component may include a trifurcated (psi-shaped) plane. In other embodiments intermediate ribs 308 may be separate components attached to stiffener

148. For example, and without limitation, fins 308 may be welded, bolted, adhered, and the like, to stiffener 148.

Figure 5:
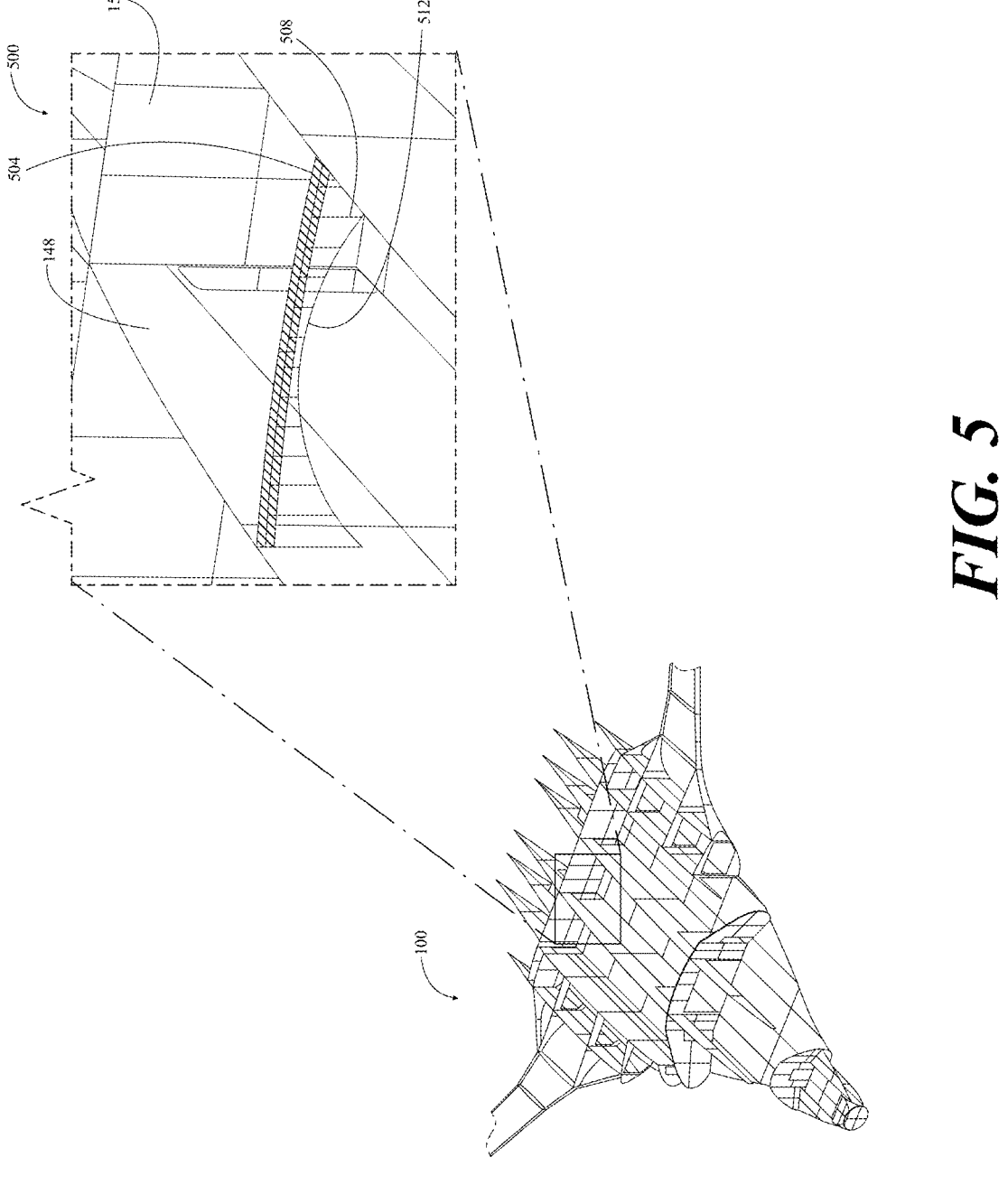
FIG. 5 is a schematic diagram showing a third exemplary embodiment of a support element of the airframe in accordance with one or more embodiments of the present disclosure.

Now referring to FIG. 5, a third exemplary embodiment of a support element 500 is shown. In one or more embodiments, support element 500 may include a stiffener 504, which may be attached to an adjacent pair of longitudinal stiffeners 148 of the plurality of longitudinal stiffeners. Stiffener 504 may extend laterally between two or more longitudinal stiffeners 148. In one or more embodiments, support element 500 may include a plurality of vertical tensioners 508 that extend from stiffener 504 and toward base 160, such as an upper surface 164 of base 160. In one or more embodiments, support element 500 may include a horizontal tensioner 512, which may be attached to each of the plurality of vertical tensioners. In some embodiments, horizontal tensioner 512 may be curved. In some embodiments, horizontal tensioner may be arc-shaped.

Figure 6:
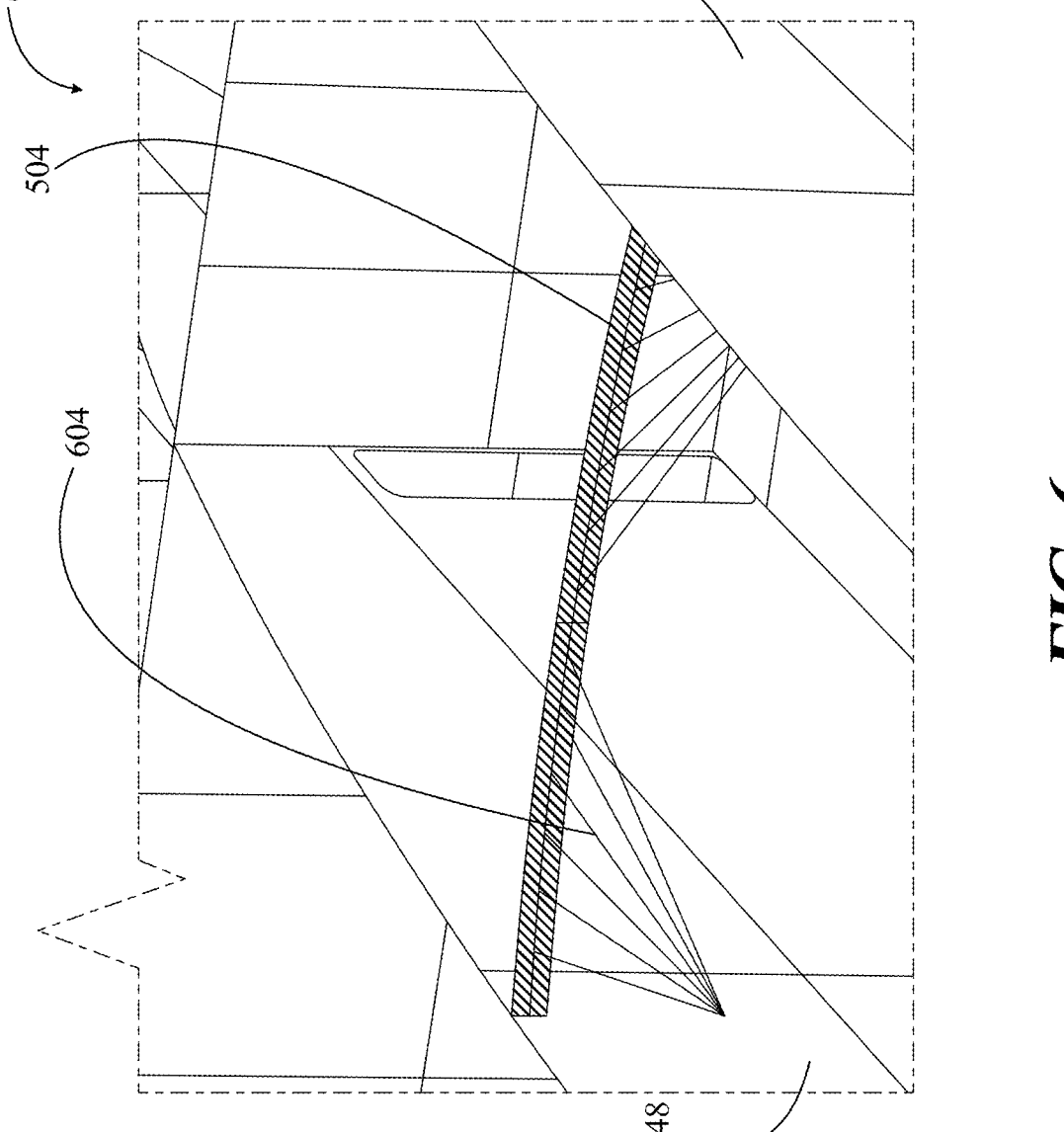
FIG. 6 is a schematic diagram showing a fourth exemplary embodiment of a support element of the airframe in accordance with one or more embodiments of the present disclosure.
Figure 7:
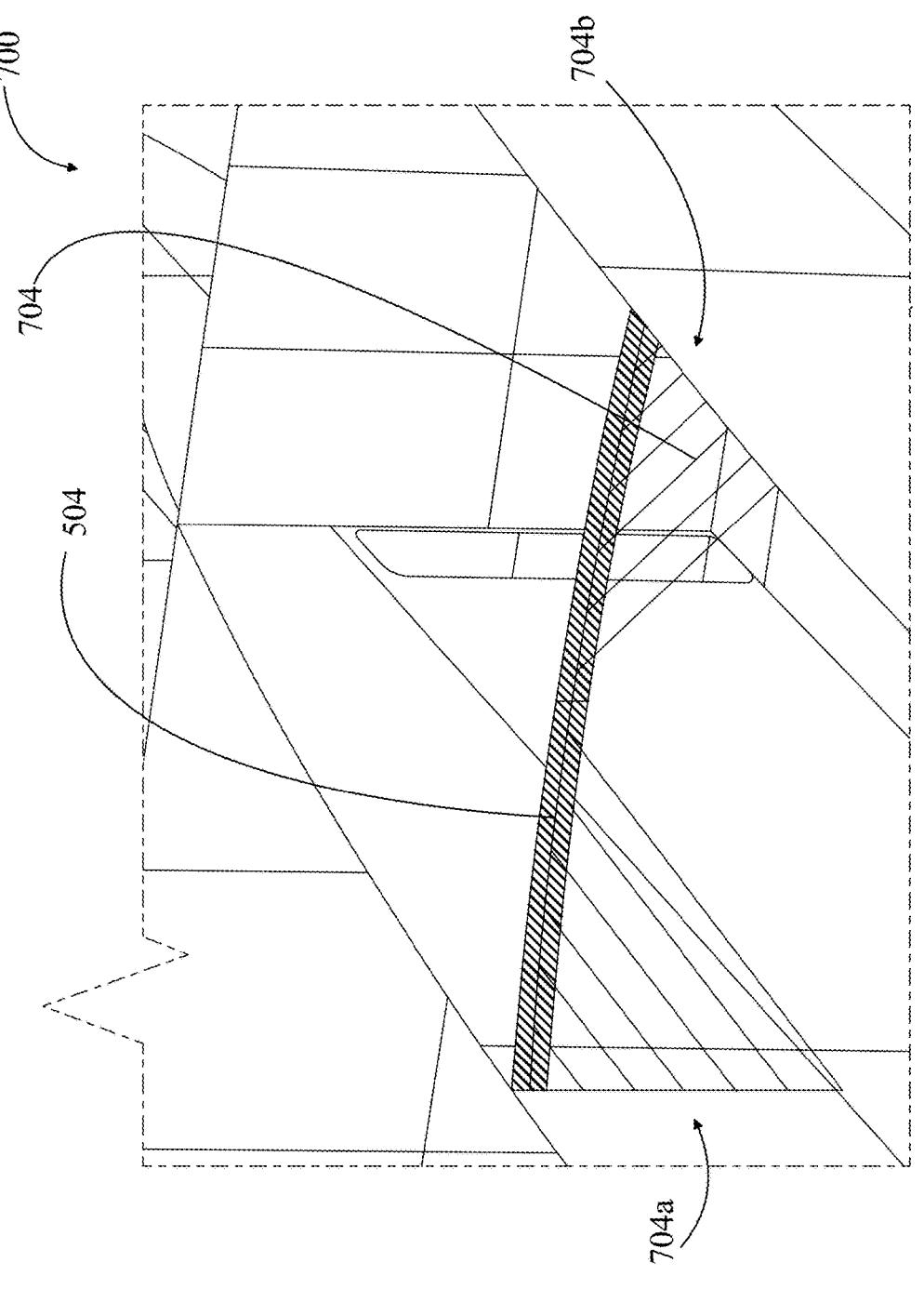
FIG. 7 is a schematic diagram showing a fifth exemplary embodiment of a support element of the airframe in accordance with one or more embodiments of the present disclosure.

Still referring to FIG. 5, in one or more embodiments, vertical tensioners 508 may be attached to stiffener in varying arrangements, as discussed in FIGS. 5-7. In one or more embodiments, support element 500 may include stiffener 404 (e.g., a lateral stiffener) that is configured to extend between two longitudinal stiffeners 148, such as stiffeners 148*b* and 148*c*, as shown in FIG. 5. Stiffener 504 may include a curved or straight stiffener. For example, and without limitation, a curvature of stiffener 504 may complement a curved underside surface of a biasing portion of skin 120. Support element 500 may further include one or more tensioners. In various embodiments, support element 500 may include one or more vertical tensioners 508 and/or horizontal tensioners 512. For example, and without limitations, support element 500 may include a plurality of vertical tensioners 504 that are attached to stiffener 504 at a first end and attached to a horizontal tensioner 512 at a second end. In some embodiments, horizontal tensioner 512 may include a curved horizontal tensioner, where horizontal tensioner 512 is disposed between a pair of longitudinal stiffeners 148. A first end of horizontal tensioner 512 may be attached to a first longitudinal stiffener 148 and a second end of horizontal tensioner 512 may be attached to a second longitudinal stiffener 148. In one or more embodiments, vertical tensioners 508 may be substantially parallel relative to each other. In one or more embodiments, vertical tensioners 508 may be equally spaced. In other embodiments, vertical tensioners 508 may be spaced out a varying distances along stiffener 504. Stiffeners and tensioners may be composed of varying materials. For example, and without limitation, stiffeners and tensioners may be composed of carbon fiber, metal alloy, aluminum, steel, wood, and the like. Stiffeners may be composed of the same material as tensioners, or stiffeners and tensioners may be composed of varying materials. In some embodiments, tensioners may be composed of a rigid material (e.g., solid or hollow beam). In other embodiments, tensioners may be composed of a flexible material (e.g., cable).

Now referring to FIG. 6, support element 600 of airframe 100 is shown. Support element 600 may include stiffener 504 and plurality of tensioners 604. In one or more embodiments, stiffener 504 may be positioned between a pair of longitudinal stiffeners 148 so that stiffener extends from a first longitudinal stiffener 148 to a second longitudinal stiffener 148. Each end of stiffener 504 may be attached to a different rib. In one or more embodiments, tensioners 604 may be attached at the same location on a surface of longitudinal stiffener 148 and at different distances on stiffener 504. For example, and without limitation, a proximal end of each tensioner 604 may be attached and/or mounted to longitudinal stiffener 148 at the substantially same location of surface of longitudinal stiffener 148, and each distal end of tensioner 604 may be attached to stiffener 504 at a different location. In some embodiments, each different locations may be equidistant to adjacent different locations. In one or more embodiments stiffener 504 may be attached to skin 120 of aircraft 128.

Now referring to FIG. 7, a fifth exemplary embodiment of a support element 700 is shown. In one or more embodiments, support element 700 includes stiffener 504 and a plurality of tensioners 704. Tensioners 704 may be arranged so that tensioners are substantially parallel to each other. Tensioners may be arranged so that tensioners 704 are attached to stiffener 504 at a first end and longitudinal stiffener 148 at a second end, thus, each tensioner 704 may be oriented at an angle relative to longitudinal stiffener 148. In various embodiments, tensioners 704 may be equally spaced. In nonlimiting embodiments, a first plurality of tensioners 704a may be attached to a first longitudinal stiffener 148, and a second plurality of tensioner 704b may be attached to a second longitudinal stiffener 148. In one or more embodiments, a plurality of support elements 700 may be positioned longitudinally between stiffeners 148 to minimize eccentric loads. In some exemplary embodiments, skin may act as a pressure vessel (between the cabin and the atmosphere) and lateral stiffeners may be used to attach to the skin. The lateral stiffeners may be supported by tensioners. Such a support element may allow for less intrusion of support element on cabin volume of fuselage.

Figure 8:
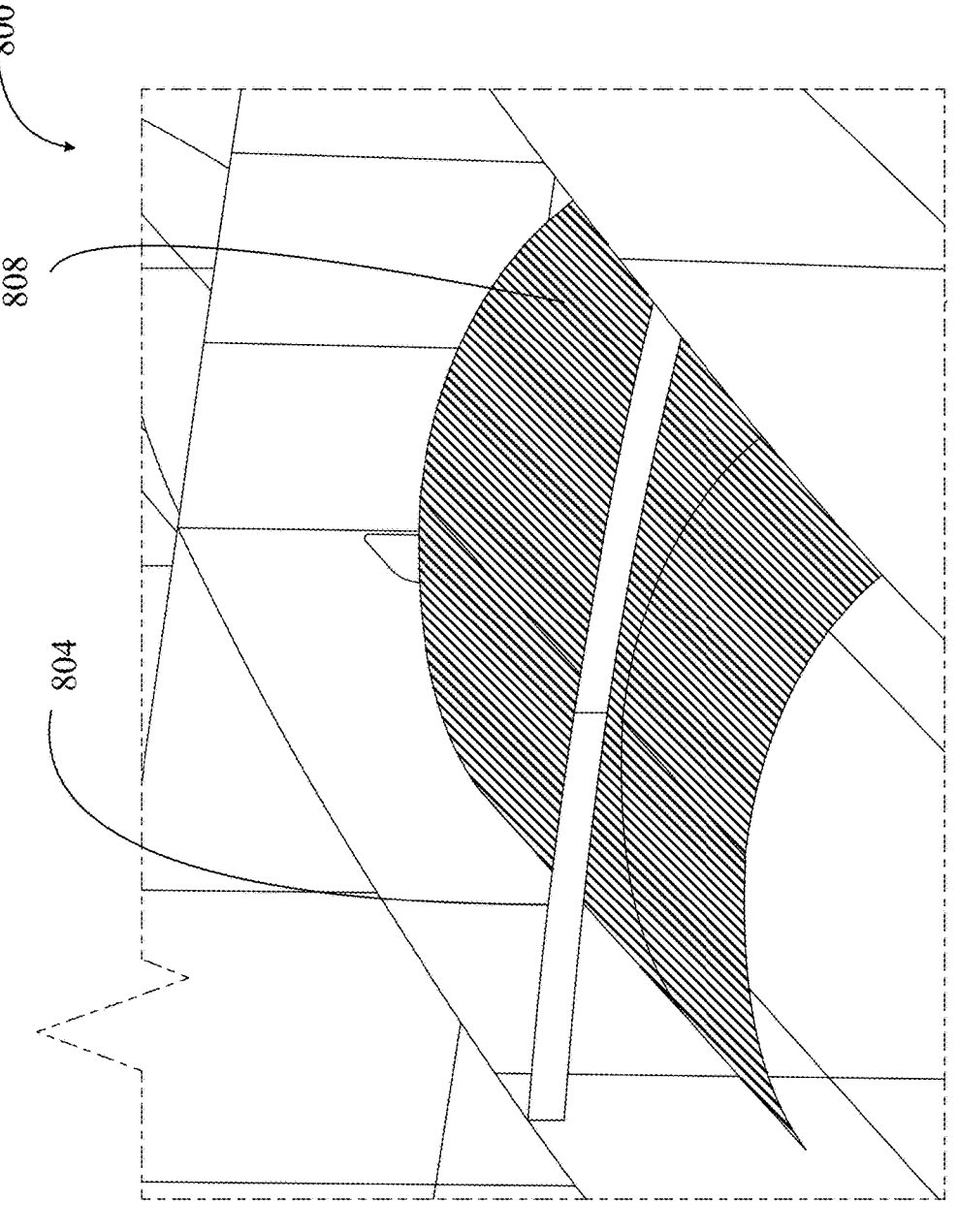
FIG. 8 is a schematic diagram showing a sixth exemplary embodiment of a support element of the airframe in accordance with one or more embodiments of the present disclosure.

Now referring to FIG. 8, a sixth exemplary embodiment of a support element 800 is shown. Support element 800 allows for wing bending and cabin pressurization responsibility to be distributed into support element 800. In one or more embodiments, support element 800 may include a straight stiffener 804 and a surface stiffener 808. Surface stiffener 808 may be positioned below straight stiffener 804. In some embodiments, surface stiffeners 808 may include a curved planar stiffener. Upper wing bending loads may be addressed by a surface stiffener 808. Surface stiffener 808 may include an arched plane positioned between two longitudinal stiffeners 148, where surface stiffener 808 is attached to each longitudinal stiffener 148. In various embodiments, a plurality of surface stiffeners may be positioned between a pair of longitudinal stiffeners 148 so that the plurality of surface stiffeners run along a length of airframe 100 to form an arched longitudinal membrane and/or shell that resists pressure loads experienced by aircraft 128. For example, and without limitation, a longitudinal arrangement of a plurality of surface stiffeners may extend eft to an aft pressure bulkhead of aircraft and forward to a cockpit bulkhead. Support element 808 may provide a lightweight solution. Surface stiffener may be attached to straight stiffener 804. In other embodiments, surface stiffener 808 may be separate from straight stiffener 804. As understood by one skilled in the art, any combination of the above-described support elements may be used in any combination and/or quantity.

Figure 9:
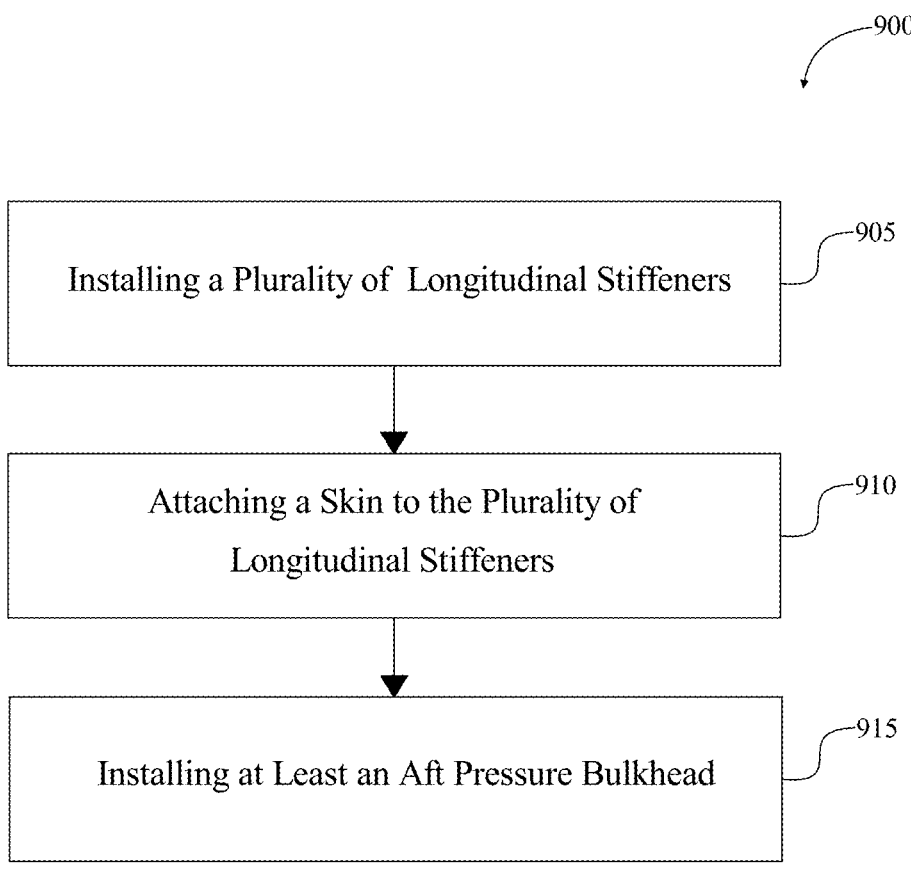
FIG. 9 is a flow chart showing a process of manufacture of an airframe of a blended wing aircraft in accordance with one or more embodiments of the present disclosure.

Now referring to FIG. 9, an exemplary method of manufacture 900 of an airframe of blended wing body aircraft 128 is shown in accordance with one or more embodiments of the present disclosure. As shown in block 905, method 900 includes installing a plurality of longitudinal stiffeners substantially parallel to a longitudinal axis A of airframe 100, extending from a top side of airframe 100 to a bottom side 140 of airframe 100. In one or more embodiments, the plurality of longitudinal stiffeners 148 include at least a laterally outermost bulkhead 152 configured to resist a cabin pressure. Longitudinal stiffeners may include any of the longitudinal stiffeners previously discussed in this disclosure, such as the exemplary longitudinal stiffeners of FIGS. 1-8. Airframe may include any of the airframes previously discussed in this disclosure, such as the exemplary airframes of FIGS. 1-8.

As shown in block 910, method 900 includes attaching skin 120, which includes an outer mold line (OML) of airframe 100, to the plurality of longitudinal stiffeners 148 at the top side 136 of airframe 100 and bottom side 140 of airframe 100. In one or more embodiments, skin 120 may include upper skin 172 at top side 136 of airframe 100 and lower skin 176 at bottom side 140 of airframe 100. Skin may include any of the skins previously discussed in this disclosure, such as the exemplary skins of FIGS. 1-8.

As shown in block 915, method 900 includes installing at least an aft pressure bulkhead 156 substantially orthogonal to longitudinal axis A, extending from top side 136 of airframe 100 to bottom side 140 of airframe 100 configured to resist cabin pressure. Aft pressure bulkhead may include any of the aft pressure bulkheads previously discussed in this disclosure, such as the exemplary aft pressure bulkheads of FIGS. 1-8.

In one or more embodiments, method 900 further includes installing a base 160 over longitudinal axis A and a lateral axis B of airframe. In one or more embodiments, base 160 includes upper surface 164 and lower surface 168. Method 900 may further include attaching the plurality of the longitudinal stiffeners 148 at one or more of upper surface 164 of base 160 and lower surface 168 of base 160.

In one or more embodiments, method 900 further includes installing at least a support element substantially orthogonal to longitudinal axis A, and attaching the at least a support element to adjacent longitudinal stiffeners of the plurality of longitudinal stiffeners 148.

In one or more embodiments, method 900 further includes installing at least a support element, wherein installing the at least a support element further includes attaching a stiffener to an adjacent pair of longitudinal stiffeners of the plurality of longitudinal stiffeners 148, installing a plurality of vertical tensioners from the stiffener and toward base 160; and attaching a horizontal tensioner to each of the plurality of vertical tensioners.

In one or more embodiments, method 900 further includes installing at least a support element, wherein installing the at least a support element further includes attaching a straight stiffener to an adjacent pair of longitudinal stiffeners of the plurality of longitudinal stiffeners, attaching a surface stiffener to the adjacent pair of longitudinal stiffeners, and positioning the surface stiffener below the straight stiffener.

In one or more embodiments, method 900 further includes installing at least a support element, wherein installing the at least a support element includes attaching a stiffener to an adjacent pair of longitudinal stiffeners of the plurality of longitudinal stiffeners, installing a plurality of tensioners, each tensioner of the plurality of tensioners having a first end and a second end, and attaching the first end to the stiffener and the second end to one longitudinal stiffener of the adjacent pair of longitudinal stiffeners. In one or more embodiments, the method may also include attaching the second end of each tensioner of the plurality of tensioners to the one longitudinal stiffener at the same location.

In one or more embodiments, method 900 further includes installing at least a support element, wherein installing the at least a support element includes installing a "Y"-shaped support element from opposing surfaces of at least a longitudinal stiffener of the plurality of longitudinal stiffeners and attaching the "Y"-shaped support element to the skin.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An airframe of a blended wing body aircraft, the airframe comprising:
   a multi-chamber airframe comprising:
      carbon fiber-based composite; and
      at least two non-cylindrical cabin chambers attached together;
   a plurality of longitudinal stiffeners running substantially parallel to a longitudinal axis of the airframe and directly connected to a top side of the airframe and through a planar base of the airframe, wherein the plurality of longitudinal stiffeners are configured to compartmentalize the airframe into the at least two non-cylindrical cabin chambers;
   at least a laterally outermost bulkhead configured to resist a cabin pressure;
   a skin comprising an outer mold line of the airframe and configured to attach to the plurality of longitudinal stiffeners at the top side of the airframe and a bottom side of the airframe;
   at least an aft pressure bulkhead running substantially orthogonal to the longitudinal axis, extending from the top side of the airframe to the bottom side of the airframe configured to resist the cabin pressure, wherein the aft pressure bulkhead is a rear pressure containing component configured to resist pressure loading between an atmosphere and a cabin at an aft of the aircraft; and
   a plurality of support elements situated orthogonal to the plurality of longitudinal stiffeners, wherein a support element of the plurality of support elements comprises at least one arc-shaped support element attached to at least one longitudinal stiffener.

2. The airframe of claim 1, wherein the support element is configured to be attached to adjacent longitudinal stiffeners of the plurality of longitudinal stiffeners.

3. The airframe of claim 1, wherein the skin comprises an upper skin at the top side of the airframe and a lower skin at the bottom side of the airframe.

4. The airframe of claim 1, further comprising at least an additional support element comprising:

a straight stiffener attached to an adjacent pair of longitudinal stiffeners of the plurality of longitudinal stiffeners,
   wherein the at least one arc-shaped support element is positioned below the straight stiffener.

5. The airframe of claim 1, wherein the planar base extends over the longitudinal axis and a lateral axis of the airframe.

6. The airframe of claim 5, wherein:
   the planar base comprises a plurality of lateral beams; and
   the plurality of longitudinal stiffeners is each attached to one or more of the plurality of lateral beams of the planar base.

7. The airframe of claim 1, further comprising at least an additional support element comprising:
   a stiffener attached to an adjacent pair of longitudinal stiffeners of the plurality of longitudinal stiffeners; and
   a plurality of tensioners, each tensioner of the plurality of tensioners having a first end and a second end;
   wherein the first end is attached to the stiffener and the second end is attached to one longitudinal stiffener of the adjacent pair of longitudinal stiffeners.

8. The airframe of claim 7, wherein the second end of each tensioner of the plurality of tensioners is attached to each longitudinal stiffener at a same location.

9. A method of manufacturing an airframe of a blended wing body aircraft, the method comprising:
   installing a multi-chamber airframe comprising:
      carbon-fiber based composite; and
      at least two non-cylindrical cabin chambers attached together;
   installing a plurality of longitudinal stiffeners substantially parallel to a longitudinal axis of the airframe, directly connected to a top side of the airframe and through a planar base, wherein the plurality of longitudinal stiffeners are configured to compartmentalize the airframe into the at least two non-cylindrical cabin chambers and wherein the plurality of longitudinal stiffeners comprise:
      at least a laterally outermost bulkhead configured to resist a cabin pressure;
   attaching a skin, comprising an outer mold line of the airframe, to the plurality of longitudinal stiffeners at the top side of the airframe and a bottom side of the airframe;
   installing at least an aft pressure bulkhead substantially orthogonal to the longitudinal axis, extending from the top side of the airframe to the bottom side of the airframe configured to resist the cabin pressure wherein the aft pressure bulkhead is a rear pressure containing component; and
   installing a plurality of support elements situated orthogonal to the plurality of longitudinal stiffeners, wherein a support element of the plurality of support elements comprises at least one arc-shaped support element attached to at least one longitudinal stiffener.

10. The method of claim 9, wherein the support element is attached to adjacent longitudinal stiffeners of the plurality of longitudinal stiffeners.

11. The method of claim 9, wherein the skin comprises an upper skin at the top side of the airframe and a lower skin at the bottom side of the airframe.

12. The method of claim 9, further comprising installing at least an additional support element, wherein installing the at least an additional support element further comprises:

attaching a straight stiffener to an adjacent pair of longi-
tudinal stiffeners of the plurality of longitudinal stiff-
eners;

and positioning the at least one arc-shaped support element
below the straight stiffener.

13. The method of claim 9, wherein the planar base
extends over the longitudinal axis and a lateral axis of the
airframe.

14. The method of claim 13, wherein the planar base
comprises a plurality of lateral beams, and wherein the
method further comprises attaching each of the plurality of
longitudinal stiffeners to one or more of the plurality of
lateral beams of the planar base.

15. The method of claim 9, further comprising installing
at least an additional support element, wherein installing the
at least an additional support element comprises:

attaching a stiffener to an adjacent pair of longitudinal
stiffeners of the plurality of longitudinal stiffeners;

installing a plurality of tensioners, each tensioner of the
plurality of tensioners having a first end and a second
end; and attaching the first end to the stiffener and the second end
to one longitudinal stiffener of the adjacent pair of
longitudinal stiffeners.

16. The method of claim 15, further comprising attaching
the second end of each tensioner of the plurality of tension-
ers to each longitudinal stiffener at a same location.

\*    \*    \*    \*    \*